(12) United States Patent
Wang

(10) Patent No.: US 7,356,688 B1
(45) Date of Patent: Apr. 8, 2008

(54) SYSTEM AND METHOD FOR DOCUMENT DISTRIBUTION

(75) Inventor: Xin Wang, Los Angeles, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 0 days.

(21) Appl. No.: 09/469,726

(22) Filed: Dec. 21, 1999

Related U.S. Application Data

(60) Provisional application No. 60/128,164, filed on Apr. 6, 1999.

(51) Int. Cl.
*H04L 9/00* (2006.01)

(52) U.S. Cl. ............... 713/153; 713/150; 713/165; 713/167; 713/168; 380/277; 380/278; 380/280; 380/281; 380/28; 380/45; 726/12

(58) Field of Classification Search ......... 713/165, 713/171, 200–201, 150, 153, 167, 168; 209/225, 209/228; 380/277–278, 281–286, 28–30, 380/228, 259, 268, 44, 280, 45; 726/2–5, 726/26–30
See application file for complete search history.

(56) References Cited

U.S. PATENT DOCUMENTS

| | | | |
|---|---|---|---|
| 3,263,158 A | 7/1966 | Janis | |
| 3,609,697 A | 9/1971 | Blevins et al. | |
| 3,790,700 A | 2/1974 | Callais et al. | |
| 3,798,605 A | 3/1974 | Feistel | |
| 4,159,468 A | 6/1979 | Barnes et al. | |
| 4,220,991 A | 9/1980 | Hamano et al. | |
| 4,278,837 A | 7/1981 | Best | |
| 4,323,921 A | 4/1982 | Guillou | |
| 4,442,486 A | 4/1984 | Mayer | |
| 4,529,870 A | 7/1985 | Chaum | |
| 4,558,176 A | 12/1985 | Arnold et al. | |
| 4,593,376 A | 6/1986 | Volk | |
| 4,614,861 A | 9/1986 | Pavlov et al. | |
| 4,644,493 A | 2/1987 | Chandra et al. | |
| 4,658,093 A | 4/1987 | Hellman | |

(Continued)

FOREIGN PATENT DOCUMENTS

EP    0 084 441    7/1983

(Continued)

OTHER PUBLICATIONS

"Encryption Technology to Thwart Computer Hackers System should protect security of E-Commerce"; Aug. 28, 1998; Irish Times; City Edition, Dublin; p. 57.*

(Continued)

*Primary Examiner*—Kim Vu
*Assistant Examiner*—Beemnet W Dada
(74) *Attorney, Agent, or Firm*—Marc S. Kaufman; Nixon Peabody LLP

(57) ABSTRACT

Methods for transferring among key holders in encoding and cryptographic systems the right to decode and decrypt messages in a way that does not explicitly reveal decoding and decrypting keys used and the original messages. Such methods are more secure and more efficient than typical re-encoding and re-encryption schemes, and are useful in developing such applications as document distribution and long-term file protection.

22 Claims, 14 Drawing Sheets

U.S. PATENT DOCUMENTS

| | | | |
|---|---|---|---|
| 4,713,753 A | 12/1987 | Beobert et al. | |
| 4,817,140 A | 3/1989 | Chandra et al. | |
| 4,827,508 A | 5/1989 | Shear | |
| 4,868,376 A | 9/1989 | Lessin et al. | |
| 4,891,838 A | 1/1990 | Faber | |
| 4,924,378 A | 5/1990 | Hershey et al. | |
| 4,932,054 A | 6/1990 | Chou et al. | |
| 4,937,863 A | 6/1990 | Robert et al. | |
| 4,949,187 A | 8/1990 | Cohen | |
| 4,953,209 A | 8/1990 | Ryder, Sr. et al. | |
| 4,961,142 A | 10/1990 | Elliott et al. | |
| 4,975,647 A | 12/1990 | Downer et al. | |
| 4,977,594 A | 12/1990 | Shear | |
| 4,999,806 A | 3/1991 | Chernow et al. | |
| 5,010,571 A | 4/1991 | Katznelson | |
| 5,014,234 A | 5/1991 | Edwards, Jr. | |
| 5,023,907 A | 6/1991 | Johnson et al. | |
| 5,047,928 A | 9/1991 | Wiedemer | |
| 5,050,213 A | 9/1991 | Shear | |
| 5,052,040 A | 9/1991 | Preston et al. | |
| 5,058,164 A | 10/1991 | Elmer et al. | |
| 5,103,476 A | 4/1992 | Waite et al. | |
| 5,113,519 A | 5/1992 | Johnson et al. | |
| 5,136,643 A | 8/1992 | Fischer | |
| 5,138,712 A | 8/1992 | Corbin | |
| 5,146,499 A | 9/1992 | Geffrotin | |
| 5,148,481 A | 9/1992 | Abraham et al. | |
| 5,159,182 A | 10/1992 | Eisele | |
| 5,183,404 A | 2/1993 | Aldous et al. | |
| 5,191,193 A | 3/1993 | Le Roux | |
| 5,204,897 A | 4/1993 | Wyman | |
| 5,222,134 A | 6/1993 | Waite et al. | |
| 5,235,642 A | 8/1993 | Wobber et al. | |
| 5,247,575 A | 9/1993 | Sprague et al. | |
| 5,255,106 A | 10/1993 | Castro | |
| 5,260,999 A | 11/1993 | Wyman | |
| 5,263,157 A | 11/1993 | Janis | |
| 5,263,158 A | 11/1993 | Janis | |
| 5,276,444 A | 1/1994 | McNair | |
| 5,276,735 A | 1/1994 | Boebert et al. | |
| 5,291,596 A | 3/1994 | Mita | |
| 5,301,231 A | 4/1994 | Abraham et al. | |
| 5,311,591 A | 5/1994 | Fischer | |
| 5,319,705 A | 6/1994 | Halter et al. | |
| 5,337,357 A | 8/1994 | Chou et al. | |
| 5,339,091 A | 8/1994 | Yamazaki et al. | |
| 5,341,429 A | 8/1994 | Stringer et al. | |
| 5,347,579 A | 9/1994 | Blandford | |
| 5,381,526 A | 1/1995 | Ellson | |
| 5,394,469 A | 2/1995 | Nagel et al. | |
| 5,410,598 A | 4/1995 | Shear | |
| 5,412,717 A | 5/1995 | Fischer | |
| 5,428,606 A | 6/1995 | Moskowitz | |
| 5,432,849 A | 7/1995 | Johnson et al. | |
| 5,438,508 A | 8/1995 | Wyman | |
| 5,444,779 A | 8/1995 | Daniele | |
| 5,453,601 A | 9/1995 | Rosen | |
| 5,455,953 A | 10/1995 | Russell | |
| 5,457,746 A | 10/1995 | Dolphin | |
| 5,473,687 A | 12/1995 | Lipscomb et al. | |
| 5,473,692 A | 12/1995 | Davis | |
| 5,499,298 A | 3/1996 | Narasimhalu et al. | |
| 5,502,766 A | 3/1996 | Boebert et al. | |
| 5,504,814 A | 4/1996 | Miyahara | |
| 5,504,818 A | 4/1996 | Okano | |
| 5,504,837 A | 4/1996 | Griffeth et al. | |
| 5,509,070 A | 4/1996 | Schull | |
| 5,511,122 A * | 4/1996 | Atkinson | 713/153 |
| 5,530,235 A | 6/1996 | Stefik et al. | |
| 5,532,920 A | 7/1996 | Hartrick et al. | |
| 5,534,975 A | 7/1996 | Stefik et al. | |
| 5,539,735 A | 7/1996 | Moskowitz | |
| 5,563,946 A | 10/1996 | Cooper et al. | |
| 5,568,552 A | 10/1996 | Davis | |
| 5,621,797 A | 4/1997 | Rosen | |
| 5,629,980 A | 5/1997 | Stefik et al. | |
| 5,633,932 A | 5/1997 | Davis et al. | |
| 5,634,012 A | 5/1997 | Stefik et al. | |
| 5,638,443 A | 6/1997 | Stefik et al. | |
| 5,649,013 A | 7/1997 | Stuckey et al. | |
| 5,655,077 A | 8/1997 | Jones et al. | |
| 5,708,717 A | 1/1998 | Alasia | |
| 5,734,823 A | 3/1998 | Saigh et al. | |
| 5,734,891 A | 3/1998 | Saigh | |
| 5,737,413 A | 4/1998 | Akiyama et al. | |
| 5,737,416 A | 4/1998 | Cooper et al. | |
| 5,745,569 A | 4/1998 | Moskowitz et al. | |
| 5,748,783 A | 5/1998 | Rhoads | |
| 5,757,907 A | 5/1998 | Cooper et al. | |
| 5,761,686 A | 6/1998 | Bloomberg | |
| 5,765,152 A | 6/1998 | Erickson | |
| 5,768,426 A | 6/1998 | Rhoads | |
| 5,825,892 A | 10/1998 | Braudaway et al. | |
| 5,838,792 A * | 11/1998 | Ganesan | 380/282 |
| 5,841,865 A * | 11/1998 | Sudia | 380/286 |
| 5,892,900 A | 4/1999 | Ginter et al. | |
| 5,907,618 A * | 5/1999 | Gennaro et al. | 380/286 |
| 5,910,987 A | 6/1999 | Ginter et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,940,504 A | 8/1999 | Griswold | |
| 5,943,422 A | 8/1999 | Van Wie et al. | |
| 5,949,876 A | 9/1999 | Ginter et al. | |
| 5,960,086 A * | 9/1999 | Atalla | 380/44 |
| 5,982,891 A | 11/1999 | Ginter et al. | |
| 5,999,949 A | 12/1999 | Crandall | |
| 6,047,067 A | 4/2000 | Rosen | |
| 6,073,237 A * | 6/2000 | Ellison | 713/171 |
| 6,084,969 A * | 7/2000 | Wright et al. | 380/271 |
| 6,112,181 A | 8/2000 | Shear et al. | |
| 6,115,471 A | 9/2000 | Oki et al. | |
| 6,138,119 A | 10/2000 | Hall et al. | |
| 6,157,721 A | 12/2000 | Shear et al. | |
| 6,185,683 B1 | 2/2001 | Ginter et al. | |
| 6,226,618 B1 | 5/2001 | Downs et al. | |
| 6,233,684 B1 | 5/2001 | Stefik et al. | |
| 6,237,786 B1 | 5/2001 | Ginter et al. | |
| 6,240,185 B1 | 5/2001 | Van Wie et al. | |
| 6,253,193 B1 | 6/2001 | Ginter et al. | |
| 6,292,569 B1 | 9/2001 | Shear et al. | |
| 6,301,660 B1 | 10/2001 | Benson | |
| 6,327,652 B1 | 12/2001 | England et al. | |
| 6,330,670 B1 | 12/2001 | England et al. | |
| 6,345,256 B1 | 2/2002 | Milsted et al. | |
| 6,363,488 B1 | 3/2002 | Ginter et al. | |
| 6,385,596 B1 * | 5/2002 | Wiser et al. | 705/51 |
| 6,389,402 B1 | 5/2002 | Ginter et al. | |
| 6,587,946 B1 * | 7/2003 | Jakobsson | 713/180 |
| 6,859,533 B1 * | 2/2005 | Wang et al. | 380/28 |
| 6,937,726 B1 * | 8/2005 | Wang | 380/30 |
| 7,286,665 B1 * | 10/2007 | Wang | 380/30 |

FOREIGN PATENT DOCUMENTS

| | | |
|---|---|---|
| EP | 0 180 460 | 5/1986 |
| EP | 0 332 707 | 9/1989 |
| EP | 0 651 554 | 5/1995 |
| EP | 0 668 695 | 8/1995 |
| EP | 0 725 376 | 8/1996 |
| GB | 2 136 175 | 9/1984 |
| GB | 2 236 604 | 4/1991 |
| JP | 62-241061 | 10/1987 |
| JP | 64-068835 | 3/1989 |

| | | |
|---|---|---|
| JP | 04-369068 | 12/1992 |
| JP | 05-268415 | 10/1993 |
| JP | 06-175794 | 6/1994 |
| JP | 06-215010 | 8/1994 |
| JP | 07-084852 | 3/1995 |
| JP | 07-200317 | 8/1995 |
| JP | 07-244639 | 9/1995 |
| JP | 0 715 241 | 6/1996 |
| WO | WO 92/20022 | 11/1992 |
| WO | WO 93/01550 | 1/1993 |
| WO | WO 94/01821 | 1/1994 |
| WO | WO 96/24092 | 8/1996 |
| WO | WO 97/48203 | 12/1997 |
| WO | WO 98/11690 | 3/1998 |
| WO | WO 98/42098 | 9/1998 |
| WO | WO 99/49615 | 9/1999 |
| WO | WO 01/63528 | 8/2001 |

OTHER PUBLICATIONS

"Researchers Say Hackers Thwarted"; Sep. 23, 1998; Credit Union Journal, New York; p. 13.*

"New Encryption System Provides Practical, Unbreakable Protection"; Aug. 24, 1998; Business Wire, New York; p. 1.*

Huafei Zhu, Lee Chan, & Xioatie Deng; Variation of Cramer-Shoup Public Key Scheme; Jul. 8, 1999; Electronic Letters; vol. 35, Issue 14; p. 1150.*

George Black; An 'Unbreakable' Encryption System; Sep. 2, 1998; Financial Times; Surveys Edition, London; p. 2.*

"National Semiconductor and EPR Partner for Information Metering/Data Security Cards" Mar. 4, 1994, Press Release from Electronic Publishing Resources, Inc.

Weber, R., "Digital Rights Management Technology" Oct. 1995.

Flasche, U. et al., "Decentralized Processing of Documents", pp. 119-131, 1986, Comput. & Graphics, vol. 10, No. 2.

Mori, R. et al., "Superdistribution: The Concept and the Architecture", pp. 1133-1146, 1990, The Transactions of the IEICE, V E73 Jul. 1990, No. 7 Tokyo JP.

Weber, R., "Metering Technologies for Digital Intellectual Property", pp. 1-29, Oct. 1994, A Report to the International Federation of Reproduction Rights Organizations.

Clark, P.C. et al., "Bits: A Smartcard protected Operating System", pp. 66-70 and 94, Nov. 1994, Communications of the ACM, vol. 37, No. 11.

Ross, P.E., "Data Guard", pp. 101, Jun. 6, 1994, Forbes.

Saigh, W.K., "Knowledge is Sacred", 1992, Video Pocket/Page Reader Systems, Ltd.

Kahn, R.E., "Deposit, Registration and Recordation in an Electronic Copyright Management System", pp. 1-19, Aug. 1992, Corporation for National Research Initiatives, Virginia.

Hilts, P. et al., "Books While U Wait", pp. 48-50, Jan. 3, 1994, Publishers Weekly.

Strattner, A, "Cash Register on a Chip may Revolutionize Software Pricing and Distribution; Wave Systems Corp.", pp. 62, Apr. 1994, Computer Shopper, vol. 14, No. 4, ISSN 0886-0556.

O'Connor, M., "New Distribution Option for Electronic Publishers; iOpener Data Encryption and Metering System for CD-ROM use; Column", pp. 134, Mar. 1994, CD-ROM Professional, vol. 7, No. 2, ISSN 1409-0833.

Willett, S., "Metered PCs: Is Your System Watching You? Wave System beta tests new technology", pp. 84, May 2, 1994, InfoWorld.

Linn, R., "Copyright and Information Services in the Context of the National Research and Education Network", pp. 9-20, Jan. 1994, IMA Intellectual Property Project Proceedings, vol. 1, Issue 1.

Perrit, Jr., H., "Permission Headers and Contract Law", pp. 27-48, Jan. 1994, IMA Intellectual Property Project Proceedings, vol. 1, Issue 1.

Upthegrove, L., "Intellectual Property Header Descriptors: A Dynamic Approach", pp. 63-66, Jan. 1994, IMA Intellectual Property Proceedings, vol. 1, Issue 1.

Sirbu, M., "Internet Billing Service Design and prototype Implementation", pp. 67-80, Jan. 1994, IMA Intellectual Property Project Proceedings, vol. 1, Issue 1.

Simmel, S. et al., "Metering and Licensing of Resources: Kala's General Purpose Approach", pp. 81-110, Jan. 1994, IMA Intellectual Property Project Proceedings, vol. 1, Issue 1.

Kahn, R., "Deposit, Registration,and Recordation in an Electronic Copyright Management System", pp. 111-120, Jan. 1994, IMA Intellectual Property Project Proceedings, vol. 1, Issue 1.

Tygar, J. et al., "Dyad: A System for Using Physically Secure Coprocessors", pp. 121-152, Jan. 1994, IMA Intellectual Property Project Proceedings, vol. 1, Issue 1.

Griswold, G., "A Method for Protecting Copyright on Networks", pp. 169-178, Jan. 1994, IMA Intellectual Property Project Proceedings, vol. 1, Issue 1.

Nelson, T., "A Publishing and Royalty Model for Networked Documents", pp. 257-259, Jan. 1994, IMA Intellectual Property Project Proceedings, vol. 1, Issue 1.

Robinson, E., "Redefining Mobile Computing", pp. 238-240, 247-248 and 252, Jul. 1993, PC Computing.

Abadi, M. et al., "Authentication and Delegation with Smart-cards", 1990, Research Report DEC Systems Research Center.

Mark Stefik, "Letting Loose the Light: Igniting Commerce in Electronic Publication", pp. 219-253, 1996, Internet Dreams: Archetypes, Myths, and Metaphors, IDSN 0-262-19373-6.

Mark Stefik, "Letting Loose the Light: Igniting Commerce in Electronic Publication", pp. 2-35, Feb. 8, 1995, Internet Dreams: Archetypes, Myths, and Metaphors.

Henry H. Perritt, Jr., "Technological Strategies for Protecting Intellectual Property in the Networked Multimedia Environment", Apr. 2-3, 1993, Knowbots, Permissions Headers & Contract Law.

* cited by examiner

SYSTEM AND METHOD FOR DOCUMENT DISTRIBUTION

CROSS-REFERENCE TO RELATED APPLICATION

This application claims the benefit of U.S. Provisional Application No. 60/128,164, filed on Apr. 6, 1999.

FIELD OF THE INVENTION

The invention relates to cryptographic methods, and more particularly to systems and methods for efficiently distributing encrypted documents to a large number of recipients.

BACKGROUND OF THE INVENTION

One of the most important issues impeding the widespread distribution of digital documents via electronic commerce is the current lack of protection of the intellectual property rights of content owners during the distribution and use of those digital documents. Efforts to resolve this problem have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM").

A document, as the term is used herein, is any unit of information subject to distribution or transfer, including but not limited to correspondence, books, magazines, journals, newspapers, other papers, software, photographs and other images, audio and video clips, and other multimedia presentations. A document may be embodied in printed form on paper, as digital data on a storage medium, or in any other known manner on a variety of media.

In the world of printed documents, a work created by an author is usually provided to a publisher, which formats and prints numerous copies of the work. The copies are then sent by a distributor to bookstores or other retail outlets, from which the copies are purchased by end users.

While the low quality of copying and the high cost of distributing printed material have served as deterrents to the illegally copying of most printed documents, it is far too easy to copy, modify, and redistribute unprotected electronic documents. Accordingly, some method of protecting electronic documents is necessary to make it harder to illegally copy them. This will serve as a deterrent to copying, even if it is still possible, for example, to make hardcopies of printed documents and duplicate them the old-fashioned way.

With printed documents, there is an additional step of digitizing the document before it can be redistributed electronically; this serves as a deterrent. Unfortunately, it has been widely recognized that there is no viable way to prevent people from making unauthorized distributions of electronic documents within current general-purpose computing and communications systems such as personal computers, workstations, and other devices connected over local area networks (LANs), intranets, and the Internet. Many attempts to provide hardware-based solutions to prevent unauthorized copying have proven to be unsuccessful.

Two basic schemes have been employed to attempt to solve the document protection problem: secure containers and trusted systems.

A "secure container" (or simply an encrypted document) offers a way to keep document contents encrypted until a set of authorization conditions are met and some copyright terms are honored (e.g., payment for use). After the various conditions and terms are verified with the document provider, the document is released to the user in clear form. Commercial products such as IBM's Cryptolopes and InterTrust's Digiboxes fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

Cryptographic mechanisms are typically used to encrypt (or "encipher") documents that are then distributed and stored publicly, and ultimately privately deciphered by authorized users. This provides a basic form of protection during document delivery from a document distributor to an intended user over a public network, as well as during document storage on an insecure medium.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper-proof trusted systems is still a real challenge to existing technologies, current market trends suggest that open and untrusted systems such as PC's and workstations will be the dominant systems used to access copyrighted documents. In this sense, existing computing environments such as PC's and workstations equipped with popular operating systems (e.g., Windows and UNIX) and render applications (e.g., Microsoft Word) are not trusted systems and cannot be made trusted without significantly altering their architectures.

Accordingly, although certain trusted components can be deployed, one must continue to rely upon various unknown and untrusted elements and systems. On such systems, even if they are expected to be secure, unanticipated bugs and weaknesses are frequently found and exploited.

One particular issue arises in the context of document distribution, as described generally above. In the traditional model of document distribution, the content author and the publisher typically do not handle distribution; a separate party with distribution expertise is given that responsibility. Furthermore, while it is possible to encrypt a document (using standard techniques) so that multiple recipients can decrypt it, it is not usually known at the time a work is created who the ultimate users will be. It makes more sense for the distributor to determine who the end users will be, and to distribute the document to them as desired. If, as in traditional model, the original work of authorship is sent to a publisher and a distributor in the clear, that is a point of vulnerability for the work.

A similar problem arises in office settings, for example, in which it is frequently desirable to designate what is variously called a document agent, surrogate, or delegate. In this situation, it is often useful to be able to give an administrative assistant or secretary the right to decrypt certain document not intended directly for that person.

Considering the problem more broadly, in a networked environment, messages are often passed to recipients other than their initially intended ones. When message confidentiality is a concern and encrypted messages are forwarded, it is very desirable to allow one to decrypt these messages on behalf of another. To be concrete, suppose that Bob is the one who needs to read some message that is initially encrypted for Alice. One trivial solution is that Alice simply reveals her decryption key to Bob so that Bob can use it to decrypt the message himself. This requires Alice to trust Bob totally, which may not be acceptable to Alice. Another way to accomplish this task is to let Alice first decrypt the message, then re-encrypt it for Bob and finally send the newly encrypted message to Bob so that he can decrypt. Though the message is communicated securely, this solution is less efficient as it requires two decryption and one encryption operations in order for Bob to obtain the message. More importantly, in some situations such re-encryption solution is not even applicable or desirable. For example, Alice may not have access to the encrypted message, as it may be sent by its originator directly to Bob for communication efficiency and other considerations. Also, decrypting the encrypted message to a clear version, even if only for a short time, can be a substantial vulnerability.

Accordingly, it would be desirable to have an encryption/decryption framework that supports the ability to transfer the right to decode messages. Such a framework would allow a delegate to, essentially, authorize the re-encryption of a message for another party's use without first decrypting the original message. It would also be useful for this to be possible without the delegate ever having possession of the encrypted message.

SUMMARY OF THE INVENTION

How to transfer the right to decrypt from one key holder to another in a secure and efficient way is the subject of proxy encryption. Some specific proxy encryption schemes have been recently proposed to convert messages encrypted for one key into messages encrypted for another without revealing secret decryption keys and original messages to the public. Mambo and Okamoto have introduced several private, non-commutative, message-independent proxy encryption schemes. Blaze and Strauss have introduced a public, commutative, message-independent proxy encryption scheme.

In this disclosure, the same general problem is initially addressed but in the more general context of encoding schemes. Encoding schemes considered in this disclosure differ from encryption schemes or cryptosystems in that they do not necessarily have any security-related requirements. For an encoding scheme to be an encryption scheme, it is necessary that an eavesdropper, upon seeing an encoded message, should be unable to determine either the original message or the key used to decode the message. Working with encoding schemes makes it possible to build applications with lightweight security but high implementation efficiency, such as efficient massive document distribution and updating of ciphertext with new keys to protect long-term encrypted messages. In this disclosure, a class of encoding schemes is defined, and several example schemes are given. A process by which new schemes can be constructed using existing ones is also offered herein.

Several more formal proxy encryption schemes are then presented. A proxy encryption scheme is an encryption scheme that allows a designated key holder to decrypt messages on behalf of another key holder. This disclosure introduces two new proxy encryption schemes based on the known ElGamal scheme, with improved functionalities over existing proxy encryption schemes. They are public in the sense that proxy-related information and transformations can be safely made to the public, and at the same time non-commutative in terms of trust relationships among involved key holders. Applications of these new schemes to massive document distribution and file protection are also presented.

The basic idea in the methods present in this disclosure is as follows: in order for Alice to transfer the right to decode to Bob, Alice generates a transfer key t for Bob. With the transfer key t, Bob can re-encrypt the message initially encoded for Alice and subsequently decrypt it using his own key. Much like in proxy encryption, the transfer is performed in such a way that the transfer key does not explicitly reveal the decoding keys of either Alice or Bob, or the original message.

How to delegate the right to decrypt from one key holder to another in secure and efficient ways is the subject of proxy encryption. Very recently, some specific proxy encryption schemes have been proposed to convert messages encrypted for one key into messages encrypted for another without revealing secret decryption keys and original messages to the public. Mambo and Okamoto have described three proxy encryption schemes for the ElGamal and RSA encryption schemes. M. Mambo and E. Okamoto, "Proxy cryptosystems: Delegation of the power to decrypt ciphertexts," *IEICE Trans. on Fundamentals*, Vol. E80-A, No. 1, pp. 54-63 (1997). For the situation mentioned above, their schemes have better computational performance over the re-encryption scheme, but for security reasons require the presence of the original key holder Alice in the message conversion. Moreover, the schemes themselves do not help specifying who is the key holder that Alice wants to delegate the decryption right to. The scheme proposed by Blaze and Strauss, on the other hand, does not have these shortcomings. It is a modification of the ElGamal encryption scheme. M. Blaze and M. Strauss, "Proxy Cryptography," Draft, AT&T Research Labs, ftp://ftp.research.att.com/dist/mab/proxy.ps (May 1997). One very appearing feature of the Blaze and Strauss scheme is that it permits communicating proxy related information and performing the message conversion in public. But it introduces a more serious problem: it is commutative in the sense that Bob is able to obtain Alice's decryption key. This type of commutativity makes the proxy encryption scheme obsolete, as the entire scheme can be well simplified to giving Alice's key to Bob and letting Bob decrypt. Another issue (not necessarily a problem) created by this scheme is that once Bob has been granted the decryption right by Alice, he can decrypt all messages that are originally for Alice. This message-independence may be useful in some cases such as self-delegation but is not be desirable in many practical applications where the original key holder wants to be selective on which messages the delegated decryption is allowed.

Accordingly, the proxy encryption schemes according to the present invention, which are public and non-commutative, eliminate some of the disadvantages of other known cryptosystems.

In this disclosure, two new proxy encryption schemes are then introduced. They are all based on the ElGamal public-key encryption scheme and have comparable computational performance. Essentially, they have retained the following desirable features of the existing schemes: (i) public: the presence of the original key holder is not required after proxy information is generated, and proxy related information and operations can communicated and conducted in public; (ii) non-commutative: key holders do not have to trust each other in regard to their private decryption keys; and (iii) restricted: the key holder to whom the decryption right is delegated to is specified, and the proxy information (key) is message dependent.

Finally, delegating the right to decrypt messages is then described in the context of the Cramer-Shoup cryptosystem, which bears some advantages over other systems.

These and other features and advantages of the present invention are apparent from the Figures as fully described in the Detailed Description of the Invention.

The Figures are more fully explained in the following Detailed Description of the Invention.

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
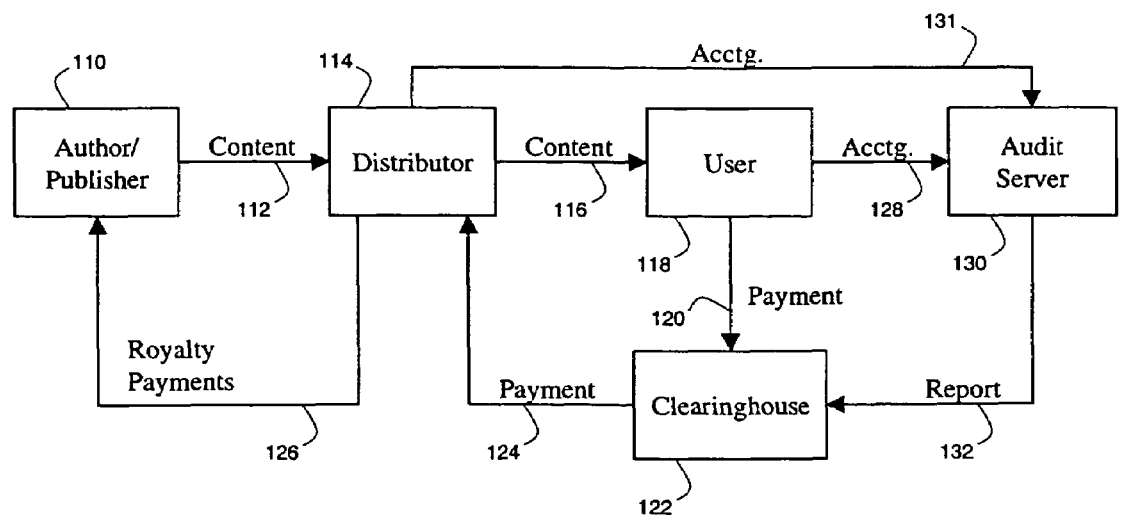
FIG. 1 is a block diagram of an electronic document distribution system capable of operation according to the invention.

FIG. 1 represents a top-level functional model for a system for the electronic distribution of documents, which as defined above, may include correspondence, books, magazines, journals, newspapers, other papers, software, audio and video clips, and other multimedia presentations.

An author (or publisher) 110 creates a document's original content 112 and passes it to a distributor 114 for distribution. Although it is contemplated that the author may also distribute documents directly, without involving another party as a publisher, the division of labor set forth in FIG. 1 is more efficient, as it allows the author/publisher 110 to concentrate on content creation, and not the mechanical and mundane functions taken over by the distributor 114. Moreover, such a breakdown would allow the distributor 114 to realize economies of scale by associating with a number of authors and publishers (including the illustrated author/publisher 110).

The distributor 114 then passes modified content 116 to a user 118. In a typical electronic distribution model, the modified content 116 represents an re-encrypted version of the original encrypted content 112; the distributor 114 first decrypts the original content 112 and then re-encrypts it with the user 118's public key; that modified content 116 is customized solely for the single user 118. The user 118 is then able to use his private key to decrypt the modified content 116 and view the original content 112.

A payment 120 for the content 112 is passed from the user 118 to the distributor 114 by way of a clearinghouse 122. The clearinghouse 122 collects requests from the user 118 and from other users who wish to view a particular document. The clearinghouse 122 also collects payment information, such as debit transactions, credit card transactions, or other known electronic payment schemes, and forwards the collected users' payments as a payment batch 124 to the distributor 114. Of course, it is expected that the clearinghouse 122 will retain a share of the user's payment 120. In turn, the distributor 114 retains a portion of the payment batch 124 and forwards a payment 126 (including royalties) to the author and publisher 110. In one embodiment of this scheme, the distributor 114 awaits a bundle of user requests for a single document before sending anything out. When this is done, a single document with modified content 116 can be generated for decryption by all of the requesting users. This technique is well-known in the art.

In the meantime, each time the user 118 requests (or uses) a document, an accounting message 128 is sent to an audit server 130. The audit server 130 ensures that each request by the user 118 matches with a document sent by the distributor 114; accounting information 131 is received by the audit server 130 directly from the distributor 114. Any inconsistencies are transmitted via a report 132 to the clearinghouse 122, which can then adjust the payment batches 124 made to the distributor 114. This accounting scheme is present to reduce the possibility of fraud in this electronic document distribution model, as well as to handle any time-dependent usage permissions that may result in charges that vary, depending on the duration or other extent of use.

The foregoing model for electronic commerce in documents, shown in FIG. 1, is in common use today. As will be shown in detail below, it is equally applicable to the system and method set forth herein for the distribution of self-protecting documents.

Proxy Encoding Schemes

For simplicity, initially consider encoding schemes of the following type. An encoding system consists of four components: (i) a message space X which is a collection of possible messages, (ii) a key space K which is a set of possible keys, (iii) a computationally efficient encoding transformation E: K×X→X and (iv) a computationally efficient decoding transformation D: K×X→X. For each k∈K, the encoding transformation $E_k$: X→X and decoding transformation $D_k$: X→X are injection (one-to-one) mappings on X, and they satisfy that, for every message x∈X, $$D_k(E_k(x))=x.$$

Certainly, such defined encoding schemes can be varied in several ways to cover a wider range of ones. One is to differentiate the space of encoded messages from the one of original messages, and another is to consider that keys used for encoding and decoding are different. In terms of cryptography, the encoding schemes considered below are essentially private-key (or, more precisely, symmetric), endomorphic cryptosystems.

Such defined encoding schemes have some advantageous properties. Given an encoding scheme (X, K, E, D), each encoding transformation and its corresponding decoding transformation are inverse transformation of each other; that is, for each $k \in K$, $$D_k = (E_k)^{-1} \text{ and } E_k = (D_k)^{-1}.$$

If X is a finite set, each encoding or decoding transformation is just a permutation on X.

Classic, symmetric-key encryption schemes are encoding schemes. Here are some of them.

XOR Scheme X. In this scheme, the message space X is the set $B_n$ of all n-bit binary strings for some integer n>0, and so is the key space K. The number of possible messages and the number of possible keys are both $2^n$. For each message x and each key k, the encoding is $$y = E_k(x) = x \oplus k$$

and the decoding of message y is $$x = D_k(y) = y \oplus k;$$

where $\oplus$ represents the bit-wise XOR (exclusive or) operation.

Multiplicative Scheme M. A message in this scheme is an element in $X = Z_n = \{0, 1, \ldots, n-1\}$ for some integer n>0. A key is also an element a in $Z_n$ but satisfying gcd(a, n)=1, where the "gcd" function specifies the greatest common integer divisor of the two arguments. That is, the key space K consists of the elements in the multiplicative group $Z_n^* = \{a \in Z_n | \gcd(a, n) = 1\}$. The encoding of a message x with a key a is $$y = E_a(x) = ax \pmod{n}$$

and the decoding of a message y with a key a is $$x = D_a(y) = a^{-1} y \pmod{n},$$

where $a^{-1}$ is the multiplicative inverse of a modulo n; that is, $a^{-1}$ is an element in $Z_n$ such that $aa^{-1} \pmod{n} = a^{-1} a \pmod{n} = 1$. Note that the condition on a, gcd(a, n)=1, is used to guarantee that a has the inverse $a^{-1}$. It is known that the number of such as is equal to the value of the Euler phi-function $$\phi(n) = \prod_{i=1}^{m} \left( p_i^{e_i} - p_i^{e_i - 1} \right)$$

where $$n = \prod_{i=1}^{m} p_i^{e_i}$$

is the prime decomposition of n. So the number of keys in the scheme M is $\phi(n)$.

Shift Scheme S. Messages and keys of the shift scheme are all elements in $Z_n = \{0, 1, \ldots, n-1\}$ for some integer n>0;
that is, $X = K = Z_n$. Thus, the number of messages and the number of keys in the shift scheme are all equal to n. To encode a message x with a key b, one calculates $$y = E_b(x) = x + b \pmod{n}$$

and to decode a message y with b, one computes $$x = D_b(y) = y - b \pmod{n}.$$

Substitution Scheme P. This scheme is also defined over $X = Z_n$. However, the key space $K = \Pi_n$ consists of all permutations of elements in $Z_n$. Thus, the total number of keys is n!. For each permutation $p \in \Pi_n$, the encoding is $$y = E_p(x) = p(x),$$

while the decoding is $$x = D_p(y) = p^{-1}(y),$$

where $p^{-1}$ is the inverse permutation of p.

It should be noted that the multiplicative and shift schemes are special cases of the substitution scheme which include only $\phi(n)$ and n of the n! possible permutations of n elements, respectively.

New encoding schemes can be constructed by combining existing ones. One way is to form their "product." Suppose S and S' are two encoding schemes with the same message space X. The product of S and S', denoted by S×S', has the same message space X. A key of the product scheme has the form (k, k'), where k and k' are keys of S and S', respectively. The encoding and decoding transformations of the product scheme are defined as follows: for each key $(k, k') \in K$, $$E_{(k,k')}(x) = E_{k'}(E_k(x))$$

and $$D_{(k,k')}(x) = D_k(D_{k'}(c)).$$

That is, the message x is first encoded with $E_k$, and the resulting message is then "re-encoded" with $E_{k'}$. Decoding is similar, but it is done in the reverse order.

It is straightforward to check that the product construction is always associative: (S×S')×S''=S×(S'×S''). If an encoding scheme S is taken to form the product with itself, one obtains the scheme S×S, denoted by $S^2$. If the n-fold product is taken, the resulting scheme, denoted by $S^n$, is called an iterated encoding scheme.

A simple example to illustrate the definition of product encoding schemes is as follows.

Affine Scheme A. This scheme is also defined over $X = Z_n$. A key of the affine scheme is a pair of integers (a, b) in $Z_n$, where gcd(a, n)=1. The encoding transformation is $$y = E_{(a,b)}(x) = (ax + b) \pmod{n}$$

and the decoding transformation is $$x = D_{(a,b)}(y) = a^{-1}(y - b) \pmod{n}$$

where $a^{-1}$ is the modular inverse of a modulo n. These transformations of the type ax+b are usually called affine transformations, hence the name affine scheme. Note that the scheme A reduces to the multiplicative scheme M when b=0 and the shift scheme S when a=1. Thus, M and S are special cases of A. On the other hand, A is their product M×S. As seen before, a key in the multiplicative scheme M is an element $a \in Z_n^*$; the corresponding encoding transformation is $E_a(x) = ax \pmod{n}$. A key in the shift scheme is an element $b \in Z_n$, and the corresponding encoding transformation is $E_b(x)=x+b$ (mod n). Hence, a key in the product scheme M×S has the form $(a,b) \in Z_n^* \times Z_n$, and its encoding is $$E_{(a,b)}(x)=E_b(E_a(x))=ax+b(\mod n).$$

This is precisely the definition of the encoding transformation in the affine scheme. Similarly, the decoding transformation in the affine scheme is the composition of the decoding transformations of the shift and multiplicative schemes.

The objective of transferring the right to decode messages in any given encoding scheme (X, K, E, D) can be stated as follows: for any given message x∈X and keys k,k'∈K, convert in some efficient way the encoded message $y=E_k(x)$ using the key k into the encoded message $y'=E_{k'}(x)$ using the key k' so that the new message y' can be decoded correctly using the key k'. If this can be achieved, it is said that the right to decode the message y has been transferred or delegated from the key holder of k to the key holder of k'.

Figure 2:
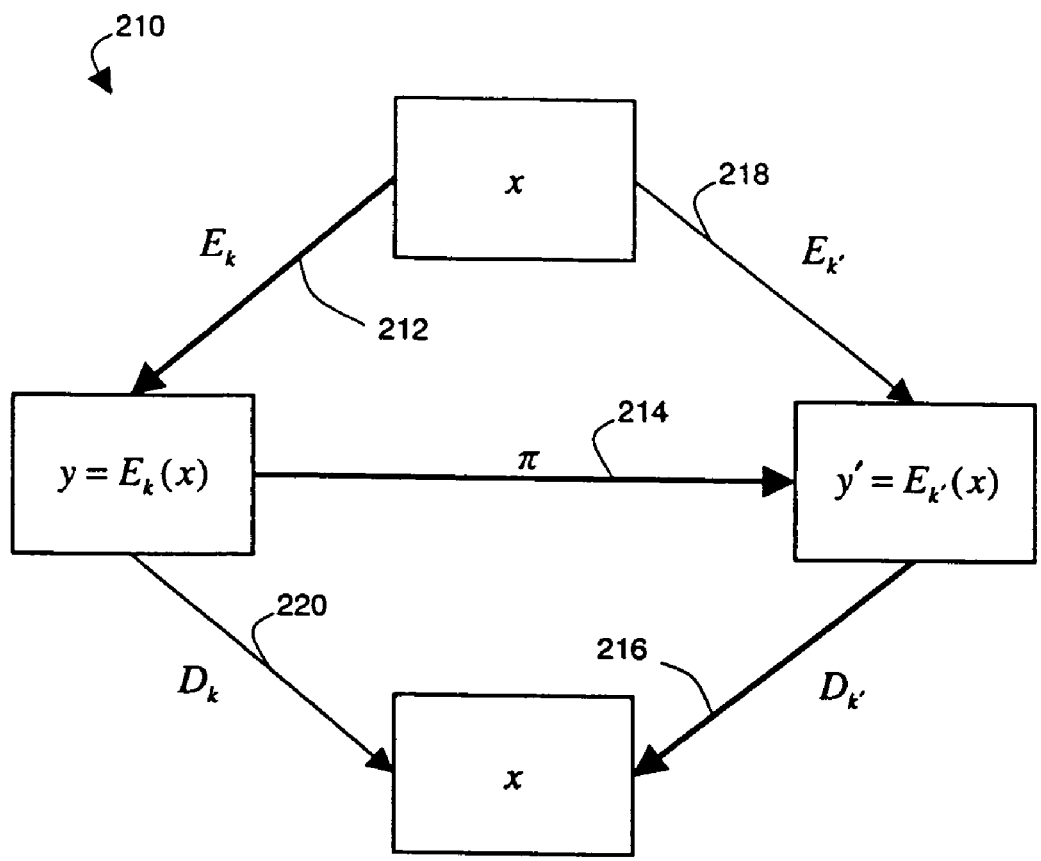
FIG. 2 is a block diagram illustrating the encoding operations performed when delegating the authority to decrypt a message in a method according to the invention.

FIG. 2 illustrates the transformation π 210 that is needed to achieve the objective. The thick lines 212, 214, and 216 representing transformations $E_k$, π, and $D_{k'}$, respectively, form a sequence of steps that encodes a message x with one key k, converts the encoded message into the other one encoded with another key k', and decodes the message using the key k'. The thin lines 218 and 220, representing the transformations $E_{k'}$ and $D_k$, respectively, show other possible encoding and decoding operations that may be performed.

In many cases, the key space K of an encoding scheme is not merely a set. Equipped with some operation "•", K may possess some mathematical structure. For instance, the key spaces of all the example schemes given in the previous section can be equipped with some operations to become mathematical groups. Table 1, below, shows some of these operations, where ○ stands for the composition operator of permutations and $$*:(Z_n^* \times Z_n) \times (Z_n^* \times Z_n) \to Z_n^* \times Z_n$$

is defined as $$(a,b)*(a',b')=(a'a(\mod n), a'b+b'(\mod n)).$$

TABLE 1

| Scheme | Key Space "K" | Operation "•" |
|---|---|---|
| X | $B_n$ | ⊕ (XOR) |
| M | $Z_n^*$ | × (mod n) |
| S | $Z_n$ | + (mod n) |
| P | $\Pi_n$ | ○ (composition) |
| A | $Z_n^* \times Z_n$ | * (defined above) |

When the key space K of an encoding scheme (X, K, E, D) is a group with some operation "•", the encoding and decoding transformations may be uniquely determined by the keys. This happens when the key space K is isomorphic, as a group, to the transformation groups $E=\{E_k|k \in K\}$ and $D=\{D_k|k \in K\}$ formed by the encoding and decoding transformations on the message space X; that is, for any k,k'∈K, $$D_k=(E_k)^{-1}=E_{k^{-1}} \text{ and } E_k \circ E_{k'}=E_{k \cdot k'}$$

and $$E_k=(D_k)^{-1}=D_{k^{-1}} \text{ and } D_k \circ D_{k'}=D_{k \cdot k'},$$

where ○ is the composition operator of the transformations, which is defined as, for example, $$E_k \circ E_{k'}(x)=E_k(E_{k'}(x))$$

for all x∈X.

It can be easily checked that all the schemes given in Table 1 above are key-determined. Key-determined encoding schemes permit a systematic way to transfer the right to decode messages from one key holder to another. With the isomorphism between the key space and the transformation groups, the composition of the decoding transformation with one key k and the encoding transformation with another key k' can then be viewed as the encoding transformation determined by the composed key $k^{-1} \cdot k$. Let (X, K, E, D) be a key-determined encoding scheme. Suppose $y=E_k(x)$ is the encoded version of the message x∈X with the key k∈K. The right to decode the encoded message of x can be transferred from the key holder of k to the key holder of k' in the two-step algorithm shown in FIG. 3.

First, generate a transfer key $t=k^{-1} \cdot k$ (step 310). Then encode the message with the transfer key t according to $y'=E_t(y)$ (step 312).

The algorithm is correct thanks to the property of the key space being isomorphic to the encoding and decoding transformation groups. The correctness can be verified as follows:

$$\begin{aligned}
D_{k'}(y') &= D_{k'}(E_t(y))\\
&= D_{k'}(E_{k^{-1} \cdot k'}(y))\\
&= D_{k'}(E_{k'}(E_{k^{-1}}(y)))\\
&= E_{k^{-1}}(y)\\
&= D_k(y)\\
&= D_k(E_k(x))\\
&= x
\end{aligned}$$

The generality of the algorithm makes it immediate to derive the transference steps for the example schemes set forth above. Referring again to FIG. 3, for the XOR Scheme X over $B_n$, to convert $y=E_k(x)$ to $y'=E_{k'}(x)$, first generate a transfer key t=k⊕k' (step 310). Then encode the message with the transfer key t according to y'=y⊕t(step 312).

For the Multiplicative Scheme M over $Z_n^*$, to convert $y=E_a(x)$ to $y'=E_a(x)$, first generate a transfer key $t=a'a^{-1}$ (mod n) (step 310). Then encode the message with the transfer key t according to y'=ty (mod n) (step 312).

For the Shift Scheme S over $Z_n$, to convert $y=E_b(x)$ to $y'=E_{b'}(x)$, first generate a transfer key t=b'−b (mod n) (step 310). Then encode the message with the transfer key t according to y'=y+t (mod n) (step 312).

For the Substitution Scheme P over $\Pi_n$, to convert $y=E_p(x)$ to $y'=E_{p'}(x)$, first generate a transfer key $t=p^{-1} \cdot p'$ (step 310). Then encode the message with the transfer key t according to y'=t(y) (step 312).

As will be described below, it is also possible to transfer the right to decode in product schemes of not only key-determined encoding but also commuting schemes. In order to define commuting schemes, it is necessary to characterize encoding schemes that are essentially equivalent. Suppose that S=(X, K, E, D) and S'=(X, K', E', D') are two encoding schemes with the same message space X. S is said to be equivalent to S', denoted by S≡S', if there is a bijective (one-to-one and onto) mapping h: K→K' such that for each message x∈X and for each key k∈K, $$E_k(x)=E_{h(k)}'(x)$$

and $$D_k(x)=D_{h(k)}'(x).$$

Clearly, the scheme equivalence relation ≡ is an equivalence relation; that is, it satisfies that, for any encoding schemes S, S', S", the following hold: (i) S≡S; (ii) S≡S' implies S'≡S; and (iii) S≡S' and S'≡S" imply S≡S". Thus, equivalent encoding schemes form an equivalence class in that each scheme in the class provides no more and no less functionality than any others in the class.

The scheme equivalence relation allows one to characterize encoding schemes in several ways. An encoding scheme S is said to be idempotent if $S^2 \equiv S$. Many of the encoding schemes are idempotent, including the XOR, multiplicative, shift, substitution, and affine schemes. If a scheme S is idempotent, then there is no point in using the product scheme $S^2$, as it requires an extra key but provides no more functionality.

Another characterization on encoding schemes using the scheme equivalence relation ≡ is that of commuting schemes. Two encoding schemes S and S' are said to commute if S×S'≡S'×S. Trivially, any scheme commutes with itself. A not-so-trivial example is that of the multiplicative scheme M and the shift scheme S. To see that they commute, i.e., M×S≡S×M, one can compare the equations $$E_b(E_a(x))=ax+b \pmod n$$

and $$E_a(E_b(x))=ax+ab \pmod n;$$

and find out that the mapping $$h: K_S \times K_M \to K_M \times K_S$$

defined by $$h(b,a)=(a, a^{-1}b \pmod n))$$

makes the product S×M isomorphic to the product M×S.

Product schemes of key-determined and commuting encoding schemes enjoy a systematic way of transferring the right to decode messages. Let $S_1 \times S_2$ be the product scheme of two key-determined and commuting encoding schemes. Suppose that $h=(h_1,h_2): K_2 \times K_1 \to K_1 \times K_2$ is the mapping that makes $S_2 \times S_1$ isomorphic to $S_1 \times S_2$, where $h_1: K_2 \times K_1 \to K_1$ and $h_2: K_2 \times K_1 \to K_2$. First, observe that the product scheme is also key-determined; the product key space $K_1 \times K_2$ is a group with respect to the operation * defined by $$(k_1,k_2)*(k_1',k_2')=(k_1 \cdot h_1(k_2,k_1'), h_2(k_2,k_1') \cdot k_2').$$

This is because $$\begin{aligned} E_{(k_1,k_2)} \cdot E_{(k_1',k_2')} &= E_{k_1} \cdot E_{k_2} \cdot E_{k_1'} \cdot E_{k_2'} \\ &= E_{k_1} \cdot E_{h_1(k_2,k_1')} \cdot E_{h_2(k_2,k_1')} \cdot E_{k_2'} \\ &= E_{k_1 \cdot h_1(k_2,k_1')} \cdot E_{h_2(k_2,k_1') \cdot k_2'} \\ &= E_{(k_1,k_2)*(k_1',k_2')} \end{aligned}$$

Figure 3:
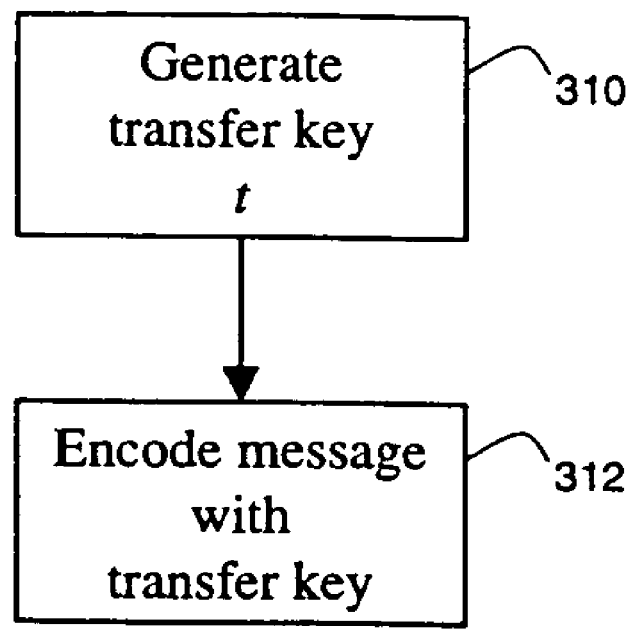
FIG. 3 is a flow chart illustrating the general steps performed in transforming an encoded message for decoding by another.

Now, the right to decode the encoded message of x can be transferred from the key holder of k to the key holder of another key k' in the two-step algorithm shown in FIG. 3. First, generate a transfer key $t=(h_1(k_2^{-1},k_1^{-1} \cdot k_1'),h_2(k_2^{-1},k_1^{-1} \cdot k_1') \cdot k_2')$ (step 310). Then encode the message with the transfer key t according to $y'=E_t(y)$ (step 312).

The correctness of the transference algorithm is verified by the following equality:

$$\begin{aligned} E_t(y) &= E_{h_1(k_2^{-1},k_1^{-1} \cdot k_1')} \cdot E_{h_2(k_2^{-1},k_1^{-1} \cdot k_1') \cdot k_2'}(y) \\ &= E_{h_1(k_2^{-1},k_1^{-1} \cdot k_1')} \cdot E_{h_2(k_2^{-1},k_1^{-1} \cdot k_1')} \cdot E_{k_2'}(y) \\ &= E_{k_2^{-1}} \cdot E_{k_1^{-1} \cdot k_1'} \cdot E_{k_2'}(y) \\ &= E_{k_2^{-1}} \cdot E_{k_1^{-1}} \cdot E_{k_1'} \cdot E_{k_2'}(y) \\ &= D_{k_2} \cdot D_{k_1} \cdot E_{k_1'} \cdot E_{k_2'}(y) \\ &= E_{k_1'} \cdot E_{k_2'}(x) \\ &= E_{(k_1',k_2')}(x) \end{aligned}$$

where the last entity can be readily decoded using the key $k'=(k_1',k_2')$.

The method is best illustrated with the following example, applying the affine cipher A over $Z_n$. Since A=M×S, and M and S are key-determined, commuting schemes, the method described above applies to the affine scheme. As seen before, it is the mapping h(b, a)=(a, ab) that makes S×M isomorphic to M×S. Thus, $h_1(b, a)=a$ and $h_2(a, b)=ab \pmod n$. The transfer key t from (a, b) to (a', b') can be derived as $$\begin{aligned} t &= (h_1(b^{-1}, a^{-1} \cdot a'), h_2(b^{-1}, a^{-1} \cdot a') \cdot b') \\ &= (a' \cdot a^{-1}, h_2(b^{-1}, a^{-1} \cdot a') + b') \\ &= (a' \cdot a^{-1}, (a' \cdot a^{-1})b^{-1} + b') \\ &= (a'a^{-1}, -a'a^{-1}b + b') \end{aligned}$$

Then, to decode y using a second key (a', b'), first generate a transfer key $t=(a'a^{-1} \pmod n, -a'a^{-1}b+b' \pmod n) \triangleq (t_1,t_2)$ (step 310). Then encode the message using the transfer key t according to $y'=t_1 y+t_2 \pmod n$ (step 312).

The methods presented herein for transferring the right to decode messages are transitive. This means that two sequential transfers from Alice to Bob and then from Bob to Carol are equivalent to a direct transfer from Alice to Carol. It is important to note that, in each of the example schemes, a transfer key is also a key of the scheme.

Accordingly, two transfer keys used in the two sequential transfers can be combined to form a transfer key for the direct transfer. Take the affine scheme as an example. Let k=(a, b), k'=(a', b'), and k"=(a", b") be the keys for Alice, Bob, and Carol, respectively. Then the transfer keys are $t=(a'a^{-1},-a'a^{-1}b+b')$ from Alice to Bob, $t'=(a''a'^{-1},-a''a'^{-1}b'+b'')$ from Bob to Carol, and $t''=(a''a^{-1},-a''a^{-1}b+b'')$ from Alice to Carol. It is straightforward to verify that the composition of t and t' as keys in the affine scheme yields t":

$$\begin{aligned} t \cdot t' &= (t'_1 t_1, t'_1 t_2 + t'_2) \\ &= ((a''a'^{-1})(a'a^{-1}), (a''a'^{-1})(-a'a^{-1}b+b') + (-a''a'^{-1}b'+b'')) \\ &= (a''a^{-1}, -a''a^{-1}b+b'') \\ &= t'' \end{aligned}$$

In other words, the composition of sequential transfers of the right to decode messages is memory-less; all the intermediate transfers will not be reflected in the overall transfer.

It should be noted also that, for the schemes X, M, and S, the transfer key generation step is equivalent to "decoding" k' with k. Thus, the computation needed in the transfer is the same as the one used in the decoding-and-re-encoding method for these schemes. One may think that the new method shows no improvement in this efficiency regard, but it has been found that the transfer key is message-independent and hence needs to be computed only once. When the number of messages m involved in the transfer increases, this feature will cut the computation required by the re-encoding method by half. Moreover, the transfer key t does not leak any useful information on the keys k and k', and a transfer performed according to the methods set forth herein will not reveal the message x. These properties make the proposed method appealing when the security of the message x and the decoding keys k and k' is an issue during a transfer.

Figure 4:
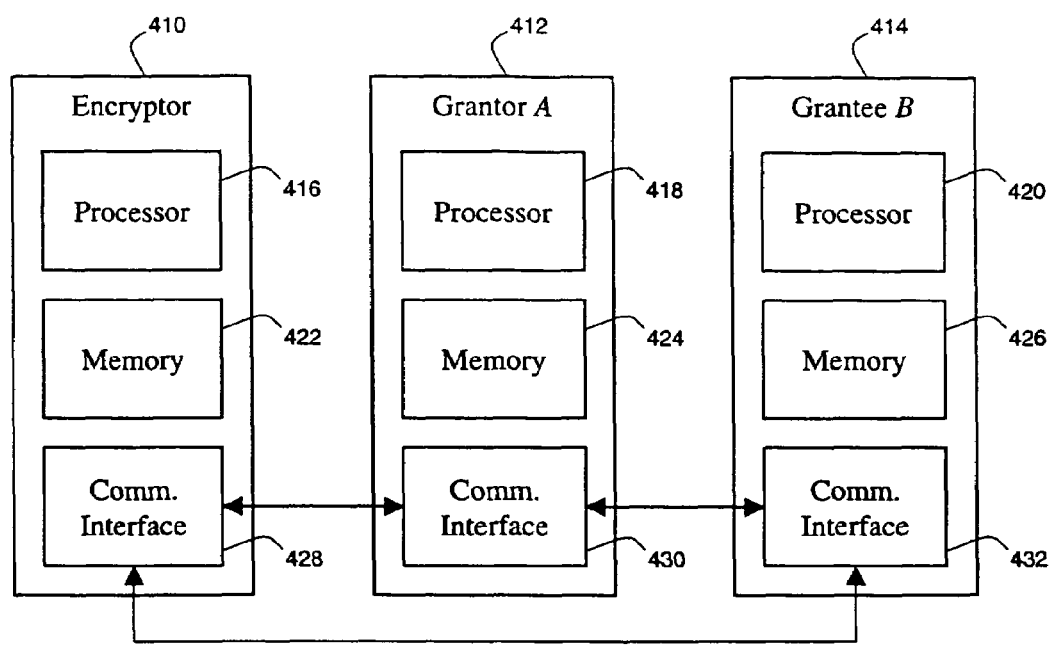
FIG. 4 is a block diagram schematically illustrating the parties involved in a system adapted for the delegation of the authority to decrypt messages.

A typical system configuration capable of carrying out the methods described with reference to FIG. 3 (and described in further detail below) is shown in FIG. 4. There are three relevant parties in most proxy encryption applications. An Encryptor 410, a Grantor A 412, and a Grantee B 414. As will be recognized, the encryption, decryption, and other processing operations performed in the invention are facilitated by a processor (416, 418, 420) under each party's control. Each processor is equipped with memory (422, 424, 426) for data storage and a communication interface (428, 430, 432), capable of sending and receiving messages.

Proxy Encryption Schemes

The rest of the disclosure, directed to more formal proxy encryption schemes, rather than encoding schemes, is organized as follows. First, a generic proxy encryption scheme is described and characterized according to several criteria. The several following paragraphs fix set forth notation that will be used throughout the disclosure and recall the ElGamal public-key encryption scheme. For the purpose of comparison, this disclosure then lists two existing proxy encryption schemes and examines their properties in comparison to the present invention. Details on the two new proxy encryption schemes are then introduced, together with their security and performance analysis. Applications of these new schemes to massive document distribution and file protection are given thereafter.

As indicated in the introduction, the goal of proxy encryption is to delegate the decryption right from one to another in secure and efficient ways. For the discussion that follows, it is convenient to define the roles of parties that may be involved in proxy encryption. Two most important roles are those of grantor and grantee. A grantor is an original key holder of encrypted messages who wants to delegate the decryption right to someone else. A grantee is a key holder designated to perform decryption on behalf of a grantor and thus act as grantor's decryption proxy. In the motivating example in the introduction, Alice is the grantor while Bob is the grantee. Other roles may include an encryptor who is an one that originally encrypts messages for the grantor, and a facilitator who may help to perform some message processing tasks, such as transforming messages encrypted for the grantor into messages encrypted for the grantee. Certainly, it is not necessary that all these roles are played by different parties. For example, a party may play roles of the grantor and facilitator, as in the Mambo and Okamoto schemes discussed below.

Figure 5:
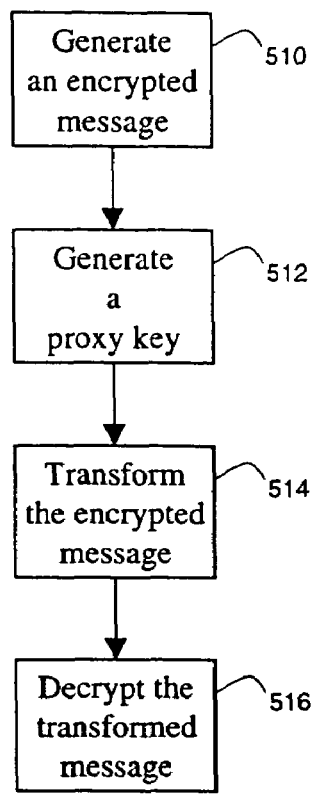
FIG. 5 is a flow chart illustrating the steps performed in a generic proxy encryption scheme.

With these roles in place, a proxy encryption scheme is just a description of how a grantee, possibly with some aid from a facilitator, delegates a grantee the right to decrypt messages originally generated by an encryptor for the grantee. A proxy encryption scheme may consist of four generic steps: message encryption, proxy key generation, proxy transformation and message decryption. These steps will be described in further detail below, with reference to FIG. 5.

1. Message encryption E: The encryptor generates an encrypted message using grantor's encryption key and delivers it to the grantor (step 510).

2. Proxy generation $\pi$: To delegate the decryption right to the grantee, the grantor generates a proxy key $\pi$ as a commitment token that allows the grantee to decrypt the message encrypted for the grantor (step 512).

3. Proxy transformation $\Pi$: When necessary, the facilitator performs a proxy transformation $\Pi$, possibly using the proxy key $\pi$, to convert the message encrypted for the grantor to a message encrypted for the grantee (step 514).

4. Message decryption D: Upon receiving the transformed message and possibly the proxy key $\pi$, the grantee decrypts the message (step 516).

Accordingly, it should be observed that the generic scheme above covers the two straightforward solutions to proxy encryption mentioned in the introduction. The re-encryption scheme is a special case where the grantor (Alice) is also the facilitator who actually decrypts the message and then encrypts for the grantee (Bob), and the proxy $\pi$ can be considered as a collection of grantor's decryption key and grantee's encryption key, which is used only by the grantor and not by the grantee. The scheme of passing grantor's decryption key to the grantee is another special case of the generic scheme, where the proxy key is the decryption key and the proxy transformation is the identity transformation.

However, not all schemes that can be derived from the generic one above are qualified as proxy encryption schemes. Intuitively, a proxy encryption scheme has to satisfy some basic requirements, namely delegation, security, transitivity and performance, as described below.

Delegation. To ensure that, at the end of the message decryption step, the grantee is able to recover the original message correctly, the following equation must hold for any message m:

$$D(\Pi(E(m,e_A),\pi),d_B,\pi)=m,$$

where E(m,e) is an encryption function of message m under encryption key e, $D(c,d,\pi)$ is a corresponding decryption function of encrypted message c under decryption key d and possibly proxy key $\pi$, $\Pi(c,\pi)$ is the proxy function that converts encrypted message c according to proxy key π, and $e_A$, $e_B$, $d_A$, and $d_B$ are the encryption and decryption keys of the grantor A and grantee B, respectively.

In addition to the correctness above, the functionality of delegation should be guaranteed. In one form, this means that, after the proxy key is issued and the proxy transformation is completed, the message decryption step should require no private information from the grantor, and it should be carried out solely by the grantee. In another form, this is equivalent to undeniability of the delegation from the grantor; that is, once the proxy key is created and proxy transformation is performed, the grantor should not be able to deny the delegation, without seeking other means such as preventing the grantee from obtaining the proxy key and receiving the transformed message. As a consequence of this functionality, the grantor's decryption key can be destroyed with grantee's decryption key and possibly the proxy key maintaining the ability to decrypt the message. (This is useful in the file protection application later in Section 6.)

Security. In essence, a proxy encryption scheme is also an encryption scheme at least from the grantee's point of view. The introduction of proxy keys and transformations must in no way com-promise security and privacy of the encryption. Thus, it should be at least computationally hard for any unauthorized third party to recover the original message and decryption keys of the grantor and grantee from publicly available information.

Moreover, forging valid proxy keys by any untrusted party should be very hard. It must be clear, though, that generating the proxy key r requires knowledge of at least the decryption key of the grantor; otherwise the underlying encryption system is not secure.

Transitivity. Naturally, the proxy relationship should be transitive. After the grantor delegates the decryption right, the grantee should be able to act as a new grantor to delegate the right further to another grantee, by just following the same scheme. Moreover, it should be possible for someone, say the first grantor, to delegate the right directly to a new grantee by combining all intermediate proxy keys into one proxy key and composing all consecutive proxy transformations into one transformation.

Performance. As the re-encryption scheme is an intuitive, straightforward solution to proxy encryption and it satisfies the above delegation, security and transitivity requirements, any practically useful proxy encryption scheme should have no degradation in computational performance when compared with the re-encryption scheme.

Proxy encryption schemes may vary according to their application requirements. They can be categorized according to many aspects. Obvious ones include whether they are public-key or private-key based, and whether their security measures are perfect in the information theoretical sense or rely on intractability of some computational problems. The following aspects. ones are related to the proxy key and transformation.

Confidentiality. While secrecy of messages and decryption keys has to be enforced, secrecy of proxy keys and proxy transformations may not be a mandatory requirement. A scheme is called public if proxy keys it generates may be published without compromising its security and proxy transformations applied in untrusted environments; otherwise, the scheme is private. In a private scheme, when a proxy key is transferred from the grantor to the facilitator and grantee, care must be taken to protect the proxy key from disclosure. As a result, the proxy transformation which uses the proxy key must be performed in private as well.

Commutativity. In terms of messages, the grantee must be unconditionally trusted by the grantor, since proxy encryption by definition allows the former to decrypt on behalf of the latter. However, the trust model may be different for their private information. A proxy encryption scheme is commutative if the grantor and grantee have to trust each other with regard to their private keys; otherwise, it is non-commutative. A commutative example is that the proxy key is such created that either one of the grantor and grantee can obtain other's decryption key from it. Whenever this is the case, the proxy encryption mechanism may be simplified to a key exchange protocol that allows the grantee to use grantor's decryption key to decrypt the encrypted messages directly.

Generality. In many cases, the grantor wants to restrict the scope of the delegated decryption right. Often intended restrictions include that the proxy key may only be used by a designated grantee, that the proxy key may only be applicable to a specific message, or that the proxy transformation may only be applied by a specific facilitator. For example, when a proxy encryption scheme is used in some applications like key escrow, it would be ideal that proxy keys are independent of messages they will apply to. But for occasional delegation such as securely specifying inheritance in someone's will, it may be highly desirable that a proxy key can only be restricted to a designated party (e.g., a grandchild), applicable to a specific message (e.g., some portion of the will) and possibly used in the proxy transformation by a particular party (an attorney).

Degenerateness. When used in the extreme situation where the grantor and grantee are a same person with a same decryption key, a proxy encryption scheme should reduce to a regular encryption scheme, without introducing any complications (such as non-trivial proxy keys and transformations, and the requirement of an extra facilitator).

As will be shown below, the Mambo and Okamoto schemes are private and non-commutative. Proxy keys in their schemes can be either message-independent or dependent but are not restricted to designated grantees. The Blaze and Strauss scheme is just opposite: it is public but commutative, and its proxy keys are message-independent but uniquely associated with designated grantees. In comparison, the schemes according to the invention set forth herein are public and non-commutative, and their proxy keys are message-dependent and restricted to designated grantees.

Proxy Encryption Using the ElGamal Cryptosystem

As the proxy encryption schemes discussed below in this disclosure will all be based on discrete logarithms in multiplicative groups, a formal setting which is common to all these encryption schemes is hereby adopted. The notation used herein recalls the ElGamal encryption scheme. Encryption schemes based on discrete logarithms are particularly advantageous because of their technical advantages over RSA-type schemes and their natural generalizations to many finite groups such as elliptic curve groups over finite fields.

As set forth above, for any natural number n, let $Z_n = \{0, 1, \ldots, n-1\}$ denote the ring of integers modulo n, and let $Z_n^* = \{m \in Z_n | \gcd(m,n) = 1\}$ denote the multiplicative group of $Z_n$. Note that, when n is a prime, $Z_n^* = \{1, \ldots, n-1\}$. For a modulo n and a number a that is relatively prime to n, let $a^{-1}$ denote the multiplicative inverse of a modulo n; that is, $a^{-1}$ is the element that satisfies $aa^{-1} \equiv 1 \pmod{n}$.

An element a of $Z_p^*$ is said to be of order m if the number of its powers modulo n is m. A generator g of $Z_n^*$, if it exists, is an element of order $|Z_n^*|$ (the size of $Z_n^*$); in this case, $Z_n^*$ is a cyclic group. When n is a prime, every element of $Z_n^*$ except 1 is a generator of $Z_n^*$.

Let $Z_n^*$ be a cyclic group with a generator g. The discrete logarithm of an element x to the base g, denoted as $\log_g x$, is the unique integer a, $0 \leq a \leq n-1$, such that $x=g^a(\mod n)$. The discrete logarithm problem is that, given a prime p, a generator g of $Z_p^*$, and an element $x \epsilon Z_p^*$, find the integer a, $0 \leq a \leq p-2$, such that $g^a \equiv x(\mod p)$.

A very closely related problem is the Diffie-Hellman problem: given a prime p, a generator g of $Z_p^*$, and elements $g^a(\mod p)$ and $g^b(\mod p)$, find $g^{ab}(\mod p)$. The discrete-logarithm problem is at least as hard as the Diffie-Hellman problem, because any solution to the former problem can be used to solve the latter problem.

Figure 6:
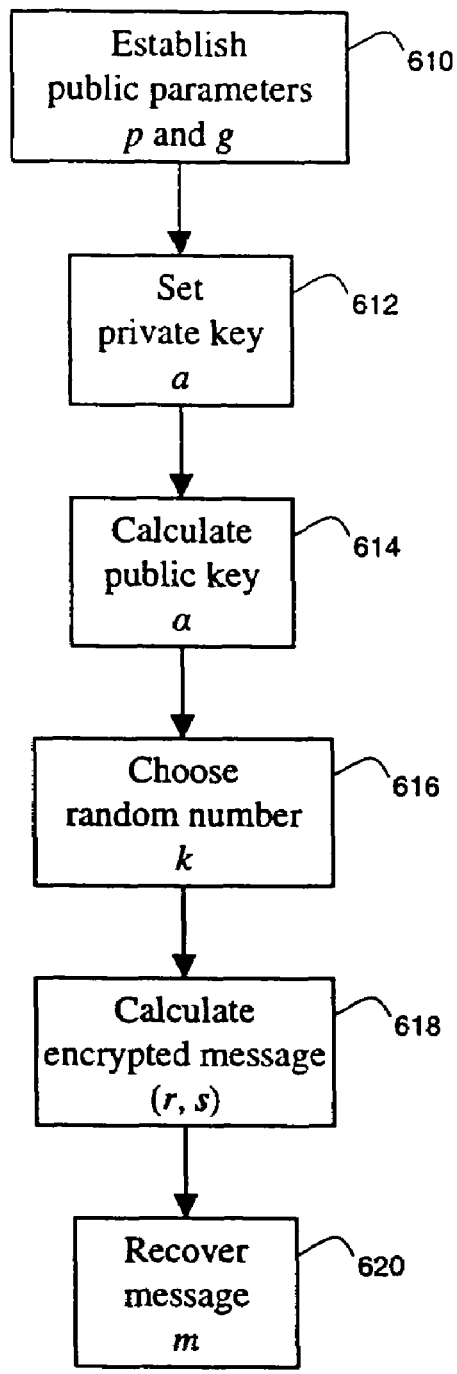
FIG. 6 is a flow chart illustrating the steps performed in encrypting and decrypting a message according to the ElGamal cryptosystem.

The ElGamal encryption scheme shown in FIG. 6 is a part of a discrete-logarithm based, public-key cryptosystem proposed by ElGamal for both encryption and digital signature. See T. ElGamal, "A public key cryptosystem and a signature scheme based on discrete logarithm," *IEEE Trans. on Information Theory*, Vol. 31, pp. 465-472 (1985).

Referring now to FIG. 6 in detail, the ElGamal scheme is set up (step 610) by establishing two public parameters p and g, where p is a prime (typically 512 bits in length), such that p−1 has a large (typically 160 bit) prime factor q (e.g., p=2q+1) and g is a generator in $Z_p^*$. A private key for a user is set (step 612) by uniformly choosing a random number $a \epsilon Z_{p-1}^*$. Its related public key is calculated (step 614) as $\alpha = g^a(\mod p)$. The user publishes $\alpha$ and keeps a secret.

To encrypt a message m to be sent to user A with public key $\alpha$, a random number $k \epsilon Z_{p-1}^*$ is uniformly chosen (step 616), and a pair of numbers (r,s), together representing the encrypted message to be sent to A, is calculated (step 618) as follows:

$r=g^k(\mod p)$ and $s=m\alpha^k(\mod p)$.

To decrypt the message (r,s), the recipient A recovers the message m (step 620) by calculating $m=s(r^a)^{-1}(\mod p)$.

Note that the selection of the public parameters is intended to establish equation $g^{p-1}(\mod p) \equiv 1$ (Fermat's little theorem). These parameters should be authentically known to all users. They can be chosen, say, by some trusted authority. Also, the way that private key a is chosen ensures that the inverse $a^{-1}$ of a modulo p−1 exists and is unique.

Unlike the RSA public-key encryption scheme, the ElGamal scheme is non-deterministic, since the encrypted message also depends on the random number k. Indeed, it is similar in nature to the Diffie-Hellman key exchange protocol; the key established between the sender and receiver for encrypting and decrypting the message m is $g^{ak}$ (mod p) from $r=g^k$(mod p) (part of the encrypted message) and $\alpha=g^a$(mod p) (the public key of A). Nevertheless, the security of the ElGamal encryption scheme relies on the intractability of the discrete logarithm problem and the Diffie-Hellman problem. To date, practice in seeking optimal algorithms for the discrete logarithm problem has not found any efficient (polynomial-time) solution. It is similar to the situation for the integer factorization problem upon which security of the RSA scheme is based. Moreover, it has also been shown that, for some primes p, solving the discrete logarithm problem is at least as hard as solving the factorization problem of a same size. This implies that for those ps, the ElGamal scheme is at least as secure as the RSA scheme.

Very recently, several proxy encryption schemes have been proposed. All these schemes follow the generic proxy encryption scheme in delegating the decryption right: the encryptor sends an encrypted message to the grantor A, who then delegates the decryption right to grantee B by creating the proxy key, and after the proxy transformation is completed the grantee B finally decrypts the message. Two representative and known proxy encryption schemes are presented below: one from Mambo and Okamoto and the other from Blaze and Strauss, both of which are variations on the ElGamal scheme. Since they have the same scheme setup as the ElGamal scheme, the setup (see steps 610-614 of FIG. 6 above) is omitted from the presentation.

Mambo and Okamoto have proposed three proxy encryption schemes: two are based on the ElGamal scheme and the other is based on the RSA scheme. The one shown in FIG. 6 and described below is ElGamal-based and shares its basic features with the other two schemes.

Figure 7:
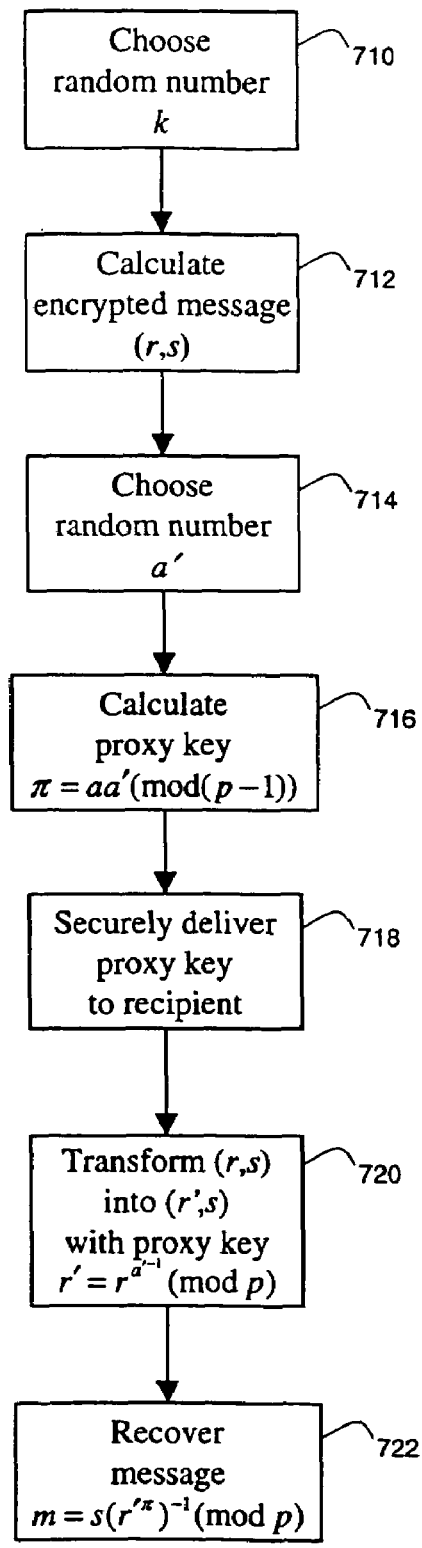
FIG. 7 is a flow chart illustrating the steps performed in a known ElGamal-based proxy encryption and decryption scheme proposed by Mambo and Okamoto.

Referring now to FIG. 7, given a message m that needs to be sent to a grantor A with public key $\alpha$, the message m is encrypted by uniformly choosing a random number $k \epsilon Z_{p-1}^*$, (step 710) and calculating a pair of numbers (r,s) representing the encrypted message (step 712) as follows:

$r=g^k(\mod p)$ and $s=m\alpha^k(\mod p)$.

To delegate the decryption right to a grantee B, the grantor A creates a proxy key $\pi$ by uniformly choosing a random number $a' \epsilon Z_{p-1}^*$ (step 714) and calculating $\pi=aa'(\mod(p-1))$ (step 716). Then, A delivers the proxy key $\pi$ to B (step 718) in a secure manner (e.g., by encrypting it with B's public key) and keeps the value of a'private.

To allow B to decrypt the message, A calculates $r'=r^{a'^{-1}}$ (mod p), where $a'^{-1}$ is the multiplicative inverse of a'modulo p−1 (step 720). The pair (r', s) is the transformed, encrypted message to be sent to B.

Upon receiving the transformed message (r', s) and the proxy key $\pi$, B decrypts the message m (step 722) by calculating $m=s(r'^\pi)^{-1}$ (mod p).

This proxy encryption scheme uses the encryption and decryption components of the ElGamal scheme, except B's private key is replaced by the proxy key $\pi$. It is correct because, when using $\pi$ to decrypt the transformed message (r', s), the following holds:

$s((r')^\pi)^{-1}(\mod p)=s(r^{aa'a'^{-1}})^{-1}(\mod p)=mg^{ka}(g^{ka})^{-1}$ (mod p)=m.

The security of this scheme is evaluated in two aspects. The complexity for anyone, including the grantee B, to discover grantor A's private key a based on all the available information is as same as the one for solving the discrete logarithm problem. The difficulty for anyone, even with the proxy key, to impersonate A to transform the encrypted message (i.e., to generate (r', s)) is the same as the one for solving the Diffie-Hellman problem.

This scheme has several very appealing features. First, its security implies that it is hard for B to recover A's private key. In this sense, there is no need for A to trust B, and hence the scheme is non-commutative. Second, the proxy key $\pi$ generated is message-independent. B can use it to decrypt all the messages transformed by A. Third, this scheme satisfies the transitivity requirement. Upon receiving both the proxy key $\pi$ and the transformed message (r', s), the delegated user B can further delegate the proxy to another user C, by treating $\pi$ as the private key a and (r', s) as (r, s) and repeating the proxy generation and transformation. Fourth, the scheme requires less computational efforts than the re-encryption scheme.

However, implementing proxy encryption in the manner of this scheme has several shortcomings. First, the proxy key contains no information about the delegated grantee B; it is solely derived from grantor A's private key. Moreover, the message decryption performed by B does not need B's private decryption key either. Consequently, the message can be recovered by anyone that gets hold of the proxy key and encrypted message, not necessarily B. Thus, B can ask anyone to decrypt the message by directly passing the proxy information. In many cases, this is not desirable; A should be able to specify the key holder who is to act on A's behalf.

Second, the proxy key $\pi$ has to be a secret between A and B and needs to be transmitted from A to B in a secure manner. As a result of $\pi$ containing no information of B and (r', s) being possibly communicated in public, revealing $\pi$ is essentially equal to disclosing the message.

Third, the proxy transformation has to be conducted by A. The value a' used in the transformation is a secret to A and it is vital to preventing B from knowing A's decryption key a.

In short, the scheme is non-commutative and message-independent, but private and unable to specify the designated grantee.

Figure 8:
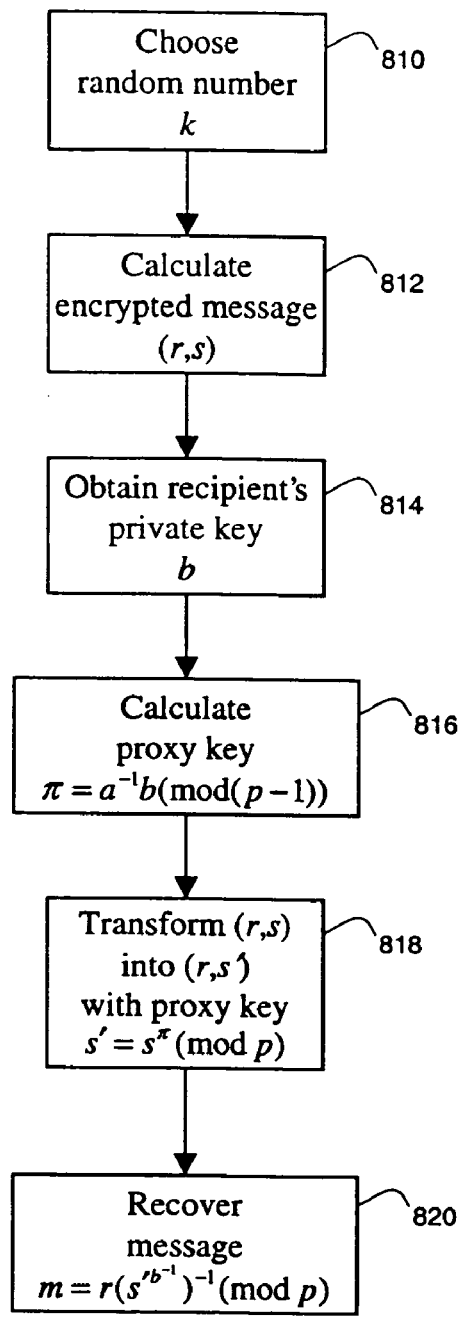
FIG. 8 is a flow chart illustrating the steps performed in a known ElGamal-based proxy encryption and decryption scheme proposed by Blaze and Strauss.

Blaze and Strauss have described another public-key proxy encryption scheme. As can be seen in FIG. 8, the scheme is similar in structure to ElGamal encryption, but with the parameters used differently and the inverse of the secret used to recover the message.

Turning now to FIG. 8 in more detail, given a message m that needs to be sent to a grantor A with public key $\alpha$, the message m is encrypted by uniformly choosing a random number $k \in Z_{p-1}^*$ (step 810) and calculating a pair of numbers (r, s) representing the encrypted message (step 812) as follows:

$$r=mg^k (\text{mod } p) \text{ and } s=\alpha^k (\text{mod } p).$$

To delegate the decryption right to a grantee B, the grantor A creates a proxy key $\pi$ by obtaining B's private decryption key b (step 814) and computing $\pi=a^{-1}b(\text{mod}(p-1))$ (step 816), where $a^{-1}$ is the inverse of the private key a of A modulo p−1. The proxy key $\pi$ can be made public.

To use the proxy key $\pi$ to convert a message (r, s) encrypted for A to a message encrypted for B, the facilitator (not necessarily A, since the proxy key $\pi$ is public) computes $s'=s^\pi$ (mod p) (step 818). The pair (r, s') represents the transformed encrypted message, which can then be transmitted to B.

To decrypt the transformed message, B computes $m=r(s^{b^{-1}})^{-1}$(mod p) (step 820), where b is B's private key and $b^{-1}$ is the inverse of b modulo p−1.

The scheme is correct, since in the message decryption $$s^{b^{-1}}=g^k(\text{mod } p) \text{ and } m=r(g^k)^{-1}(\text{mod } p).$$

The scheme is secure in that the message m and secret keys a and b cannot be recovered from the encrypted messages and public keys. Moreover, publishing the proxy key compromises neither the message m nor the secret keys a and b. More precisely, the problem of recovering m from the public information ($\alpha$, $\beta$, r, s, $\pi$, s') is as hard as the Diffie-Hellman problem.

In contrast to the previous scheme, the last security feature makes it unnecessary to keep the proxy key $\pi$ private. Thus, the grantor A can publicly send $\pi$ to whoever (facilitator) is to perform the proxy transformation, or can simply publish it. Moreover, the scheme does not require any secret from A in order to carry out the proxy transformation, and consequently it allows anyone, trusted or not, to perform the transformation and hence eliminates the necessity of A's, as well as B's, presence in the transformation.

Also unlike the previous scheme, there is no difference to the user B between decrypting a regular encrypted message and decrypting a proxy transformed message. This elegant feature allows the user B to treat all incoming encrypted messages uniformly. In fact, it is possible for an untrusted facilitator or server to perform the proxy transformation and then forward the message to the user B.

In spite of these desirable features, this scheme is commutative; the involved key holders A and B must trust one another bilaterally. B can learn A's secret key a (by multiplying the proxy key by $b^{-1}$). In addition, the proxy key is also message-independent, as it is in the previous scheme, which delegates B the right to decrypt all messages encrypted for A's private key a. Accordingly, this scheme is public and message-independent but commutative.

Two proxy encryption schemes according to the invention are presented herein, and then analyzed in regard to their security, commutativity and performance. Like the private proxy scheme, they are non-commutative, and at the same time, they support public proxy keys and transformations in the fashion the commutative proxy scheme does. However, they differ from the private and commutative schemes in that they are message dependent. Moreover, their overall performance is better than the ElGamal-based re-encryption scheme.

Again, these schemes share the same scheme setup of the ElGamal scheme, and they assume that a grantor A delegates the decryption right to a grantee B.

To understand how to adapt the ElGamal scheme into a proxy encryption scheme, it is helpful to examine some details of the ElGamal scheme. It should be noted that the r component of the encrypted message m is independent of the recipient A's private key a and public key $\alpha$. As $s=m\alpha^k$ (mod p)=$mg^{ka}$ (mod p), a is only used in the s component, and a is implicitly embedded in s's exponent. Thus, it is sufficient for the proxy transformation to convert the message encrypted for A into the message encrypted for B by removing A's private key a from s and replacing it with B's private key b. In order to prevent B from obtaining A's private key a, the function to generate the proxy key must be somehow "one-way." Indeed, this can be achieved with aid of the random number k as follows:

$$\pi=g^{k(b-a)}(\text{mod } p).$$

Consequently, the proxy transformation that completes the message conversion should look like the following:

$$s'=s\pi(\text{mod } p)=mg^{ka}g^{k(b-a)}(\text{mod } p)=mg^{kb}(\text{mod } p).$$

Figure 9:
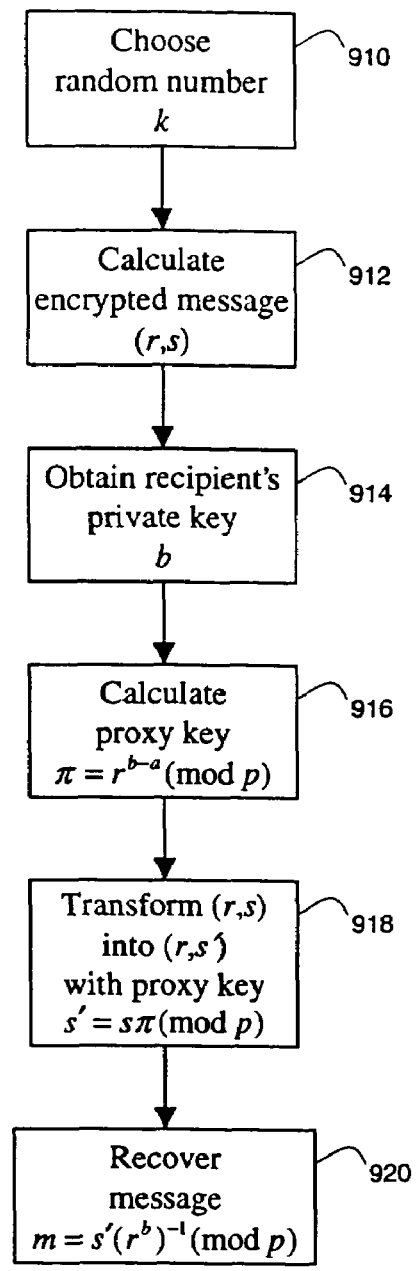
FIG. 9 is a flow chart illustrating the steps performed in a first embodiment of an ElGamal-based proxy encryption and decryption scheme according to the invention.

The above discussion leads to the scheme in FIG. 9. It turns out that the proxy key and transformation satisfy the security requirement and provide desired being-public and non-commutativity features.

Referring now to FIG. 9, given a message m that needs to be sent to a grantor A with public key $\alpha$, the message m is encrypted by uniformly choosing a random number $k \in Z_{p-1}^*$ (step 910) and calculating a pair of numbers (r, s) representing the encrypted message (step 912) as follows:

$$r=g^k(\text{mod } p) \text{ and } s=m\alpha^k(\text{mod } p).$$

To delegate the decryption right to a grantee B, grantor A creates a proxy key $\pi$ by obtaining B's authentic decryption key b (step 914) and calculating $\pi=r^{b-a}$ (mod p) (step 916).

The message is transformed from (r, s) to (r, s') by calculating $s'=s\pi(\text{mod } p)$ (step 918). The message m is then decrypted by B from (r, s') by computing $m=s'(r^b)^{-1}(\text{mod } p)$ (step 920).

Clearly, this scheme uses the message encryption and decryption steps of the ElGamal scheme. It is correct as the message m can be recovered from $$s'(r^b)^{-1}(\bmod p) = s\pi(r^b)^{-1}(\bmod p) = mg^{ak}g^{k(b-a)}(g^{kb})^{-1}$$
$$(\bmod p) = m.$$

A nice feature of this scheme is that, not only do regular and proxy encrypted messages appear no different to the grantee B, but also the scheme coincides with the ElGamal scheme when A and B are the same user with the same key; in this case, the proxy value $\pi$ is equal to 1 and the proxy transformation is the identity transformation.

It is easy to see that the scheme is transitive. Upon receiving the proxy transformed message, the grantee B can act like the grantor A to further delegate the decryption right to, say, another grantee C by repeating the proxy generation step with the keys b and c in place of a and b.

Also like the commutative scheme, the proxy generation step requires both A's and B's private keys in order to generate the proxy key $\pi$. As an alternative, this step can be carried out by anyone that is trusted by both A and B. As noted above, A's private key is definitely needed, as otherwise anyone can issue a proxy key to recover the message and the underlying encryption scheme is not secure. To establish and communicate B's private key b, many key-exchange protocols such as the Diffie-Hellman key exchange may be used. As shown in further detail below, in some practical applications the requirement of the key b either is not a problem or can be relaxed.

But unlike the private and commutative schemes, this scheme does not make it easy for the grantee B to decrypt messages encrypted for A other than the intended one. Clearly, the proxy key $\pi$ contains a piece of information that is specific to the encrypted message m, namely, the random number k. In this sense, the proxy scheme is message-dependent. Moreover, the scheme is non-commutative in the sense that it is hard for B to discover A's private key a. This fact, together with the performance of the scheme will be established after presenting the next scheme.

Note that, in the previous scheme, the proxy transformation only changes the s component of the encrypted message. Since s is the part that actually carries the information about the message m, the scheme may not be efficient when m is a very long message. For example, the proxy key generated would be as long as the message and the effort spent in the proxy transformation would be linear with regard to the length of the entire message.

Figure 10:
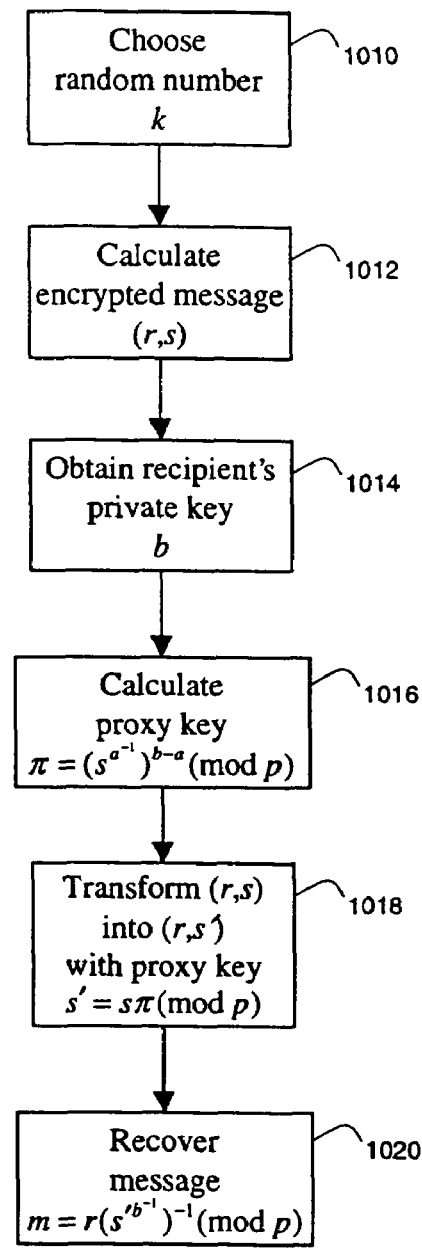
FIG. 10 is a flow chart illustrating the steps performed in a second embodiment of an ElGamal-based proxy encryption and decryption scheme according to the invention.

The scheme presented in FIG. 10 tends to improve this situation. It uses the message encryption step of the commutative scheme in which the message m is shifted from s to r. Its proxy key and transformation now have no direct dependence on the message m.

As shown in FIG. 10, given a message m that needs to be sent to a grantor A with public key $\alpha$, the message m is encrypted by uniformly choosing a random number $k \in Z_{p-1}^*$ (step 1010) and calculating a pair of numbers (r, s) representing the encrypted message (step 1012) as follows:

$$r = mg^k (\bmod p) \text{ and } s = \alpha^k (\bmod p).$$

To delegate the decryption right to a grantee B, grantor A creates a proxy key $\pi$ by obtaining B's authentic decryption key b (step 1014) and calculating $\pi = (s^{a^{-1}})^{b-a} (\bmod p)$ (step 1016), where $a^{-1}$ is the inverse of a modulo p−1.

The message is transformed from (r, s) to (r, s') by calculating $s' = s\pi (\bmod p)$ (step 1018). The message m is then decrypted by B from (r, s') by computing $m = r(s'^{b^{-1}})^{-1} (\bmod p)$ (step 1020), where $b^{-1}$ is the inverse of b modulo p−1.

This scheme is correct since $$r(s'^{b^{-1}})^{-1} (\bmod p) = r((s\pi)^{b^{-1}})^{-1} (\bmod p)$$
$$= r\left(\left(s(s^{a^{-1}})^{b-a}\right)^{b^{-1}}\right)^{-1} (\bmod p)$$
$$= r\left((g^{ka}g^{k(b-a)})^{b^{-1}}\right)^{-1} (\bmod p)$$
$$= r\left((g^{kb})^{b^{-1}}\right)^{-1} (\bmod p)$$
$$= mg^k(g^k)^{-1} (\bmod p)$$
$$= m$$

Other properties of this scheme can be verified in the same way as the previous scheme.

Due to their similarity in nature, only the first of the two new schemes is analyzed in this section in regard to its security and non-commutativity. An almost same discussion can be carried out for the second scheme. In addition, though the first scheme (as well as the second scheme) is transitive and its security may involve more than two key holders, the analysis to be given only considers the two-key-holder case; the general case is also similar. For presentation clarity, the phrase "(mod p)" will be omitted in this subsection; its occurrence should be clear from context.

Recall that, other than the scheme parameters (p, g), the public information available from the scheme includes $$\alpha = g^a, \beta = g^b, r = g^k, s = mg^{ak}, \pi = g^{k(b-1)}, s' = mg^{bk}.$$

For the reasons set forth below, the scheme is computationally secure. It is hard to recover the message m and secret keys a and b from the public information, provided that the Diffie-Hellman and discrete-logarithm problems are hard to solve. Since the proxy key is part of the public information, this implies publishing it compromises neither the message nor the secret keys. A consequence of this is that it is also hard for anyone to forge a valid proxy key in a systematic manner. Beyond that, the scheme is shown to be non-commutative in the sense that even with B's private key, it is still hard to recover A's private key. If the proxy key is indeed generated by a third party trusted by both A and B, this fact implies that it is not necessary for B to trust A either. This is a significant improvement over the commutative scheme.

Moreover, as stated above, the proxy encryption schemes of the invention are more efficient than re-encrypting a message. Below, in Table 2, is the performance of the two proxy encryption schemes according to the invention described herein compared with the re-encryption scheme using the ElGamal algorithm, in terms of the amount of computation they require. In Table 2, the numbers of multiplication operations, exponentiation operations, and inversions, all performed modulo p, are listed for these schemes.

TABLE 2

| Opera-tions | Re-Encryption | | | First Scheme (FIG. 9) | | | Second Scheme (FIG. 10) | | |
|---|---|---|---|---|---|---|---|---|---|
| | mult. | exp. | inv. | mult. | exp. | inv. | mult. | exp. | inv. |
| Encryption | 1 (×2) | 2 (×2) | 0 (×2) | 1 | 2 | 0 | 1 | 2 | 0 |

TABLE 2-continued

| Opera- | Re-Encryption | | | First Scheme (FIG. 9) | | | Second Scheme (FIG. 10) | | |
|---|---|---|---|---|---|---|---|---|---|
| tions | mult. | exp. | inv. | mult. | exp. | inv. | mult. | exp. | inv. |
| Proxy Key Gen. | | | | 0 | 1 | 0 | 0/1 | 2/1 | 1/0 |
| Transformation | | | | 1 | 0 | 0 | 1 | 0 | 0 |
| Decryption | 1 (×2) | 1 (×2) | 1 (×2) | 1 | 1 | 1 | 1 | 1 | 2/1 |
| Total | 4 | 6 | 2 | 3 | 4 | 1 | 3/4 | 5/4 | 3/1 |

Note that the total number of operations for re-encryption using the ElGamal scheme is twice the number of operations for a single ElGamal encryption and decryption, since the message must first be encrypted, then decrypted, then re-encrypted, then re-decrypted. Moreover, the computation in the second scheme can be optimized by (i) pre-computing the inverses $a^{-1}$ and $b^{-1}$ in the scheme setup step and (ii) multiplying the two exponential components (modulo (p−1)) in the proxy generation step instead of using two exponentiations. The second set of numbers under the second scheme result from this optimization. Overall, the inventive proxy encryption schemes presented herein have better performance than the simple, ElGamal-based re-encryption scheme.

Applications

Public and non-commutative proxy encryption schemes provide a key mechanism for implementing a wide range of applications. Massive document distribution and file protection are two key motivations for this disclosure. These applications correspond to two typical situations for proxy encryption. The former is related to the case where the grantor is the one who encrypts the message at the first place, while the latter is to self-delegation in which the grantor and grantee are the same key holder but with different keys.

Again, note that a document refers to any digital file whose content could text, graphics, audio, video, executable or even multi-media. Usually, a document is large in size, even after compression. Because public-key algorithms tend to be very slow when compared with conventional private-key algorithms such as DES, IDEA and RC4, and private-key algorithms require establishing secret keys to begin with, the most practical approach to massive and secure distribution of documents over networks is to combine the private-key and public-key encryption mechanisms. Typically, an efficient private-key algorithm is used to encrypt the document by using a randomly generated key, called the session key, and the public key for each document recipient is used to encrypt this session key. Recipients use their private keys to recover the secret session key and then use it to decrypt the document.

Indeed, the above document distribution approach has the proxy encryption flavor; the owner encrypts the document first using a private-key scheme and then grants the decryption right, upon request, to its recipients via a public-key scheme. It turns out that, either one of the two new proxy encryption schemes can be used to combine the best features of the approach into a single, normal encryption scheme.

Take the second scheme set forth above (FIG. 10), for example. Two observations are in order. First, the component r of the encrypted message can be generated using any private-key encryption scheme with $K=g^k$(mod p) as the secret session key. Accordingly, the message m can be recovered in the message decryption step by its corresponding private-key decryption using the secret session key $K'=s'^{b^{-1}}$(mod p)=K. In fact, the secret-key encryption scheme used in the scheme is $r=E_K(m)=mK$(mod p) for encryption and $m=D_K(r)=rK'^{-1}$(mod p) for decryption. Another simple example is the encryption scheme based on bit-wise XOR ($\oplus$). In this case, the computation of r and m can be replaced by $$r=E_K(m)=m \oplus K \text{ and } m=D_K(r)=r \oplus K.$$

Certainly, more sophisticated private-key encryption schemes such as DES and triple-DES can be employed if stronger security is needed.

The second observation is that, if the grantor A is the one who encrypts the message m, then A can keep the random number k private and use B's public key $\beta=g^b$(mod p), instead of B's private key b, to generate the proxy key:

$$\pi=(\beta \alpha^{-1})^k (\text{mod } p),$$

where $\alpha$ is A's public key. This eliminates the requirement for B's private key b (or key exchange between A and B), and implies that B does not have to trust A, either.

Figure 11:
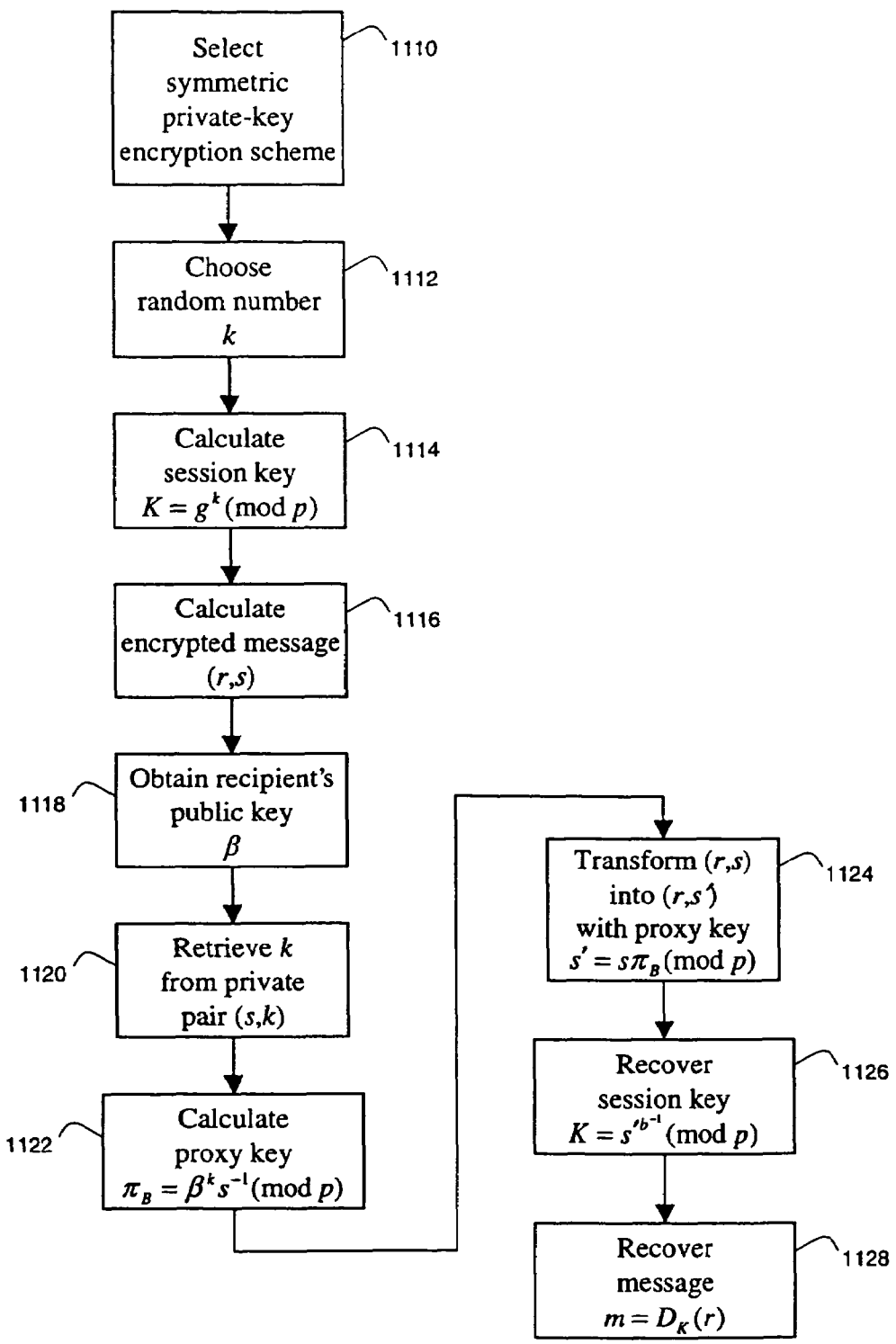
FIG. 11 is a flow chart illustrating the steps performed in a document distribution scheme according to the invention.

These two observations lead to the document distribution scheme shown in FIG. 11, which is based on the second proxy encryption scheme according to the invention set forth above (and in connection with FIG. 10). In the scheme, a private-key encryption scheme is used to encrypt the message just once for all recipients, while a less expedient proxy-key portion is used to encrypt a small amount of information—the session key—customized once for each recipient. A beneficial feature of this scheme is that the encrypted document can be stored in a publicly accessible repository, and the proxy transformation can be performed by the document owner A, the recipient B, or the repository where the document is physically stored, depending upon the needs of real document management and distribution systems.

Referring now to FIG. 11, the scheme is set up the same way as a standard ElGamal scheme (see FIG. 6, described above). In addition, a symmetric, private-key encryption scheme is selected (step 1110). Its encryption function is $m \mapsto E_K(m)$ and decryption function is $r \mapsto D_K(r)$, where K is some private key.

To encrypt a document m, owner A first chooses a uniformly random number $k \in Z_{p-1}^*$ (step 1112) and calculates a session key $K=g^k$(mod p) (step 1114). The encrypted document (r, s) is then calculated as follows:

$$r=E_K(m) \text{ and } s=K^a (\text{mod } p).$$

(step 1116), where a is A's private key. A keeps the pair (s, k) private.

Upon request from a recipient B for the encrypted document (r, s), A first obtains B's authentic public key $\beta$ (step 1118) and retrieves k from the pair (s, k) (step 1120). A then computes $\pi_B=\beta^k s^{-1}$(mod p) (step 1122), where $s^{-1}$ is the inverse of s modulo p, as the proxy key for B.

The document is then transformed by computing $s'=s\pi_B$ (mod p) (step 1124); the pair (r, s') represents the transformed document customized for B.

To decrypt the customized document (r, s') and retrieve the original document m, B first recovers the session key by calculating $K=s'^{b^{-1}}$(mod p) (step 1126), where $b^{-1}$ is the inverse of b modulo p−1. Then the document itself is decrypted by calculating $m=D_K(r)$ (step 1128).

As described above, an adaptation of the present invention is also applicable to a file protection application. Usually, file protection in insecure systems such as laptops and networked hardware involves long-term encryption of files. Thus, encryption keys used for file encryption have much longer lifetimes than their communication counterparts. While a user's primary, long-term, secret key may be the fundamental representation of a network identity of the user, there is a danger that it might get compromised if it is used for many files over a long period of time. If the primary key is lost or stolen, not only are contents of the files encrypted with it disclosed, but also the user loses personal information based on the key such as credit card account, social security number, and so on. Therefore, it is often preferable to use an on-line method in which a new decryption key is derived from the primary key every time a file needs to be encrypted and gets updated on a regular basis.

With the proxy encryption schemes set forth herein, new decryption keys can be generated and constantly updated through self-delegation to keep them fresh. Once a new key is created and a corresponding proxy key generated, the old secret key can be destroyed, with the new key and proxy key maintaining the ability to decrypt the file.

Figure 12:
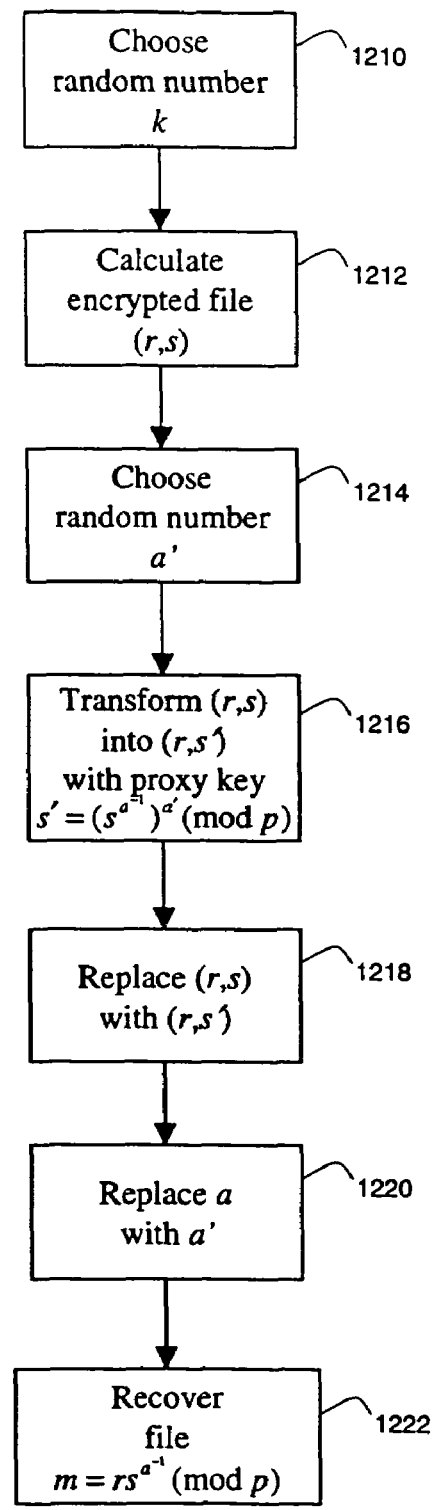
FIG. 12 is a flow chart illustrating the steps performed in a file protection scheme according to the invention.

FIG. 12 shows a file protection scheme that uses a smart card to store and update decryption keys. It is again based on the second proxy encryption scheme presented herein, as illustrated in FIG. 10.

As shown in FIG. 12, to encrypt a file m, a processor embedded in a smart card chooses a random number $k \in Z_{p-1}^*$ (step 1210) and computes $$r = mg^k \pmod{p} \text{ and } s = (g^k)^a \pmod{p}$$

(step 1212), where a is the smart card's private key. The pair (r, s) represents the file m in encrypted form.

Whenever necessary or desired, for example every few weeks or after a predetermined number of document accesses, the smart card generates another uniform random number $a' \in Z_{p-1}^*$ (step 1214) and computes $s' = (s^{a^{-1}})^{a'} \pmod{p}$ (step 1216), where $a^{-1}$ is the multiplicative inverse of a modulo p−1. The encrypted file (r, s) is then replaced with (r, s') (step 1218), and the decryption key a is replaced with a new decryption key a' (step 1220). These steps 1214-1220 can be repeated as many times as desired.

To recover the original file m from its encrypted version (r, s), the processor on the smart card uses the latest decryption key a to compute $m = rs^{a^{-1}} \pmod{p}$ (step 1222).

Note that the file encryption step can start with any secret key it generates, not necessarily the smart card's private key.

To keep encrypted files fresh by updating encryption data with a piece of smart-card-generated information helps to maintain single useful copies of protected files. This, in some sense, provides copy protection as well. Moreover, the non-commutativity of the scheme renders previous copies of the files useless, as the corresponding secret information stored in the smart card has been changed (and preferably destroyed).

Proxy Encryption Using the Cramer-Shoup Cryptosystem

Although the foregoing examples and algorithms all employ various adaptations of the ElGamal cryptosystem, it should be noted that other cryptosystems can also be adapted by a scheme according to the invention.

For example, the Cramer-Shoup public-key cryptosystem is a recently proposed cryptosystem that is the first practical public-key system to be provably immune to the adaptive chosen ciphertext attack. See R. Cramer and V. Shoup, "A Practical Public Key Cryptosystem Provably Secure against Adaptive Chosen Ciphertext Attack," *Proceedings of CRYPTO '98*, Springer Verlag LNCS, vol. 1462, pp. 13-25 (1998). The adaptive chosen ciphertext attack assumes that the attacker can obtain decryptions of any chosen ciphertexts other than the target ciphertext. For example, if the target ciphertext for which the plaintext is wanted is c, then the attacker is assumed to have access to a "decryption oracle" which will decrypt any ciphertext except c, including for example c+1, 4c, etc. RSA and ElGamal fall easily to this kind of attack. A different, but equivalent, notion of security against active attacks is called non-malleability; however, known non-malleable systems are not practical.

Figure 13:
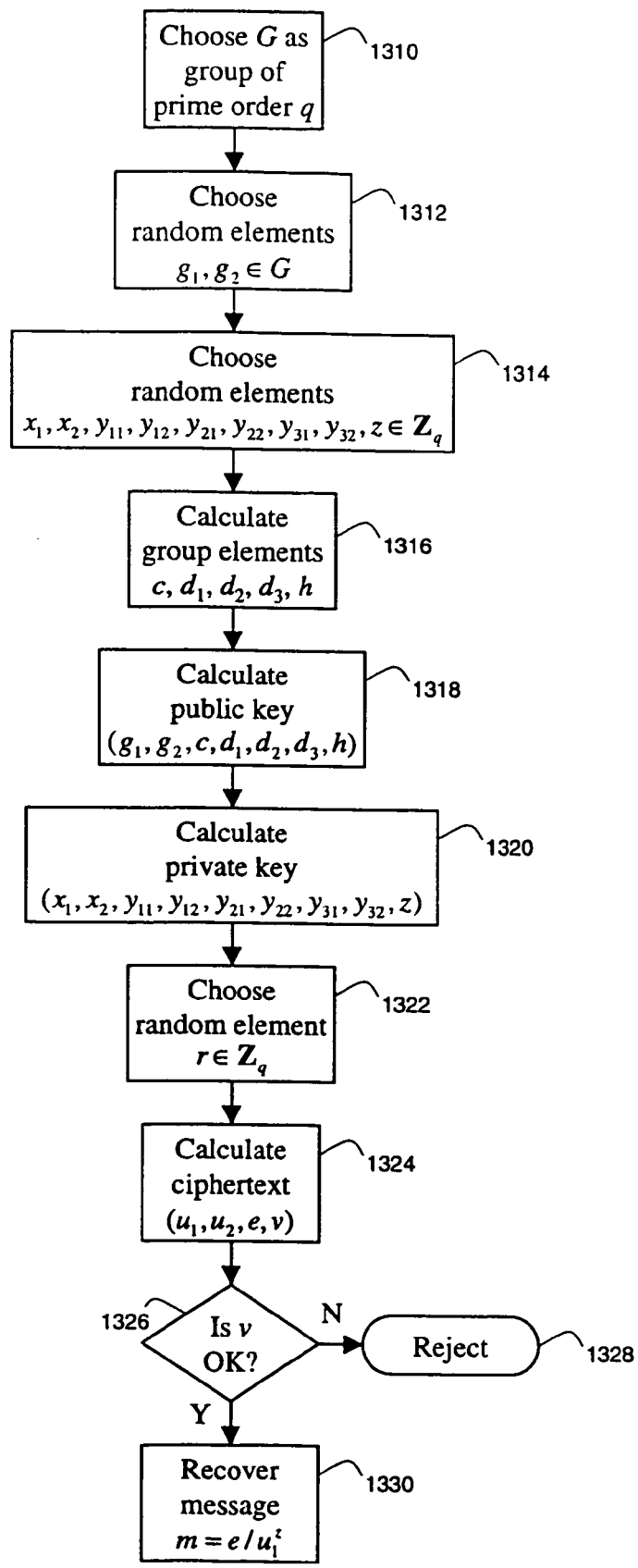
FIG. 13 is a flow chart illustrating the steps performed in encrypting and decrypting a message according to the Cramer-Shoup cryptosystem.

Set forth below in FIG. 13 is a description of a hash-free version of the Cramer-Shoup cryptosystem, the security of which is based strictly on the Diffie-Hellman decision problem for an arbitrary group. Thereafter, how to delegate the right to decrypt in a Cramer-Shoup scheme will be illustrated in two different situations.

Referring initially to FIG. 13, the system is set up by choosing G as a group of prime order q, where q is large (step 1310). The system assumes that cleartext messages are (or can be encoded as) elements of G, and ciphertext messages are elements of $G^4 = G \times G \times G \times G$; that is, a ciphertext message is four times as long as its corresponding plaintext message.

A good example of the group G is the subgroup of order q in the multiplicative set $Z_p^*$ for some large prime p=2q+1. In this case, a message m from the set $\{1, \ldots, q\}$ can be "encoded" by squaring it modulo p, resulting in an element in G, and the message m can be recovered from its encoding by computing the unique square root of its encoding modulo p, in the set $\{1, \ldots, q\}$.

A key is generated as follows. First, random elements $g_1, g_2 \in G$ are chosen (step 1312), and random elements $x_1, x_2, y_{11}, y_{12}, y_{21}, y_{22}, y_{31}, y_{32}, z \in Z_q$ are chosen (step 1314). Next, the group elements $c = g_1^{x_1} g_2^{x_2}$, $d_1 = g_1^{y_{11}} g_2^{y_{12}}$, $d_2 = g_1^{y_{21}} g_2^{y_{22}}$, $d_3 = g_1^{y_-} g_2^{y_=}$, and $h = g_1^z$ are computed (step 1316). The public key is then calculated to be $(g_1, g_2, c, d_1, d_2, d_3, h)$ (step 1318) and the private key is calculated to be $(x_1, x_2, y_{11}, y_{12}, y_{21}, y_{22}, y_{31}, y_{32}, z)$ (step 1320).

Given a message $m \in G$, the encryption method begins by choosing $r \in Z_q$ at random (step 1322). Then the ciphertext $(u_1, u_2, e, v)$ is calculated as follows (step 1324):

$$u_1 = g_1^r, u_2 = g_2^r, e = h^r m, \text{ and } v = c^r d_1^{u_1 r} d_2^{u_2 r} d_3^{er}.$$

Given the ciphertext $(u_1, u_2, e, v)$, the corresponding decryption algorithm first tests if $v = u_1^{x_1 + u_1 y_{11} + u_2 y_{21} + e y_{31}} u_2^{x_2 + u_1 y_{12} + u_2 y_{22} + e y_{32}}$ (step 1326). If not, the decryption effort is rejected (step 1328). Otherwise, the message m is calculated as $m = e/u_1^z$ (step 1330).

The correctness of a cryptosystem can be verified by checking that the decryption of an encryption of a message yields the message. In this case, since $u_1 = g_1^r$ and $u_2 = g_2^r$, one has $u_1^{x_1} u_2^{x_2} = g_1^{r x_1} g_2^{r x_2} = c^r$. Likewise, $$u_1^{x_1 + u_1 y_{11} + u_2 y_{21} + e y_{31}} u_2^{x_2 + u_1 y_{12} + u_2 y_{22} + e y_{32}} = c^r d_1^{u_1 r} d_2^{u_2 r} d_3^{er} \text{ and } u_1^z = h^r.$$

Therefore, for the valid ciphertext, the test performed in the decryption algorithm will pass.

The security of this cryptosystem relies upon the difficulty in solving the Diffie-Hellman decision problem. An algorithm that solves the Diffie-Hellman decision problem is a statistical test that can effectively distinguish the following two distributions: (a) random quadruples $(g_1, g_2, u_1, u_2) \in G^4$, and (b) random quadruples $(g_1, g_2, u_1, u_2) \in G^4$, where $g_1$, $g_2$ are random and $u_1 = g_1^r$ and $u_2 = g_2^r$ for some random $r \in Z_q$.

Related to the Diffie-Hellman decision problem are the Diffie-Hellman problem (given g, $g^x$, and $g^y$, compute $g^{xy}$), and the discrete logarithm problem (given g and g, compute x). Within polynomial time, the Diffie-Hellman decision problem can be reduced to the Diffie-Hellman problem which in turn can be reduced to the discrete logarithm problem. It is this relationship between the three problems that leads to the possibility of delegating the right to decrypt for the Cramer-Shoup system.

Assume that someone wants to delegate the right to decrypt from a delegator (Alice, A) to a delegatee (Bob, B). Suppose that Alice has the public key $(g_1,g_2,c,d_1,d_2,d_3,h)$ and the private key $(x_1,x_2,y_{11},y_{12},y_{21},y_{22},y_{31},y_{32},z)$, and that Bob has the public key $(g_1',g_2',c',d_1',d_2',d_3',h')$ and the private key $(x_1',x_2',y_{11}',y_{12}',y_{21}',y_{22}',y_{31}',y_-',z')$ Recall, that for a given plaintext message $m \in G$, the ciphertext message for delegator A is $M=(u_1,u_2,e,v)$, where $u_1=g_1^r$, $u_2=g_2^r$, $e=h^r m$, and $v=c^r d_1^{u_1 r} d_2^{u_2 r} d_3^{er}$. Similarly, if the message m is directly encrypted for the delegatee B, the ciphertext message is $M'=(u_1',u_2',e',v')$, where $u_1'=g_1'^{r'}$, $u_2'=g_2'^{r'}$, $e'=h'^{r'} m$, and $v'=c'^{r'} d_1'^{u_1' r'} d_2'^{u_2' r'} d_3'^{e'r'}$, where r' is also a random number from $Z_q$. Note further that $v=(cd^{u_1}d_2^{u_2}d_3^e)^r$ and $v'=(c'd_1'^{u_1'} d_2'^{u_2'} d_3'^{e'})^{r'}$.

Based on the ideas set forth above, to delegate the right to decrypt from A to B involves generating a transfer key $\pi$, using that transfer key to transform M into M'. In the following, it is assumed that the components $g_1'$, $g_2'$ of B's public key are identical to the components $g_1,g_2$ of A's public key (analogously to the ElGamal system parameters described above). Also, it is assumed that the random number r' is the same as r. Under these two assumptions, elements $u_1',u_2'$ of B's ciphertext message are the same as elements $u_1,u_2$ of A's ciphertext message.

Figure 14:
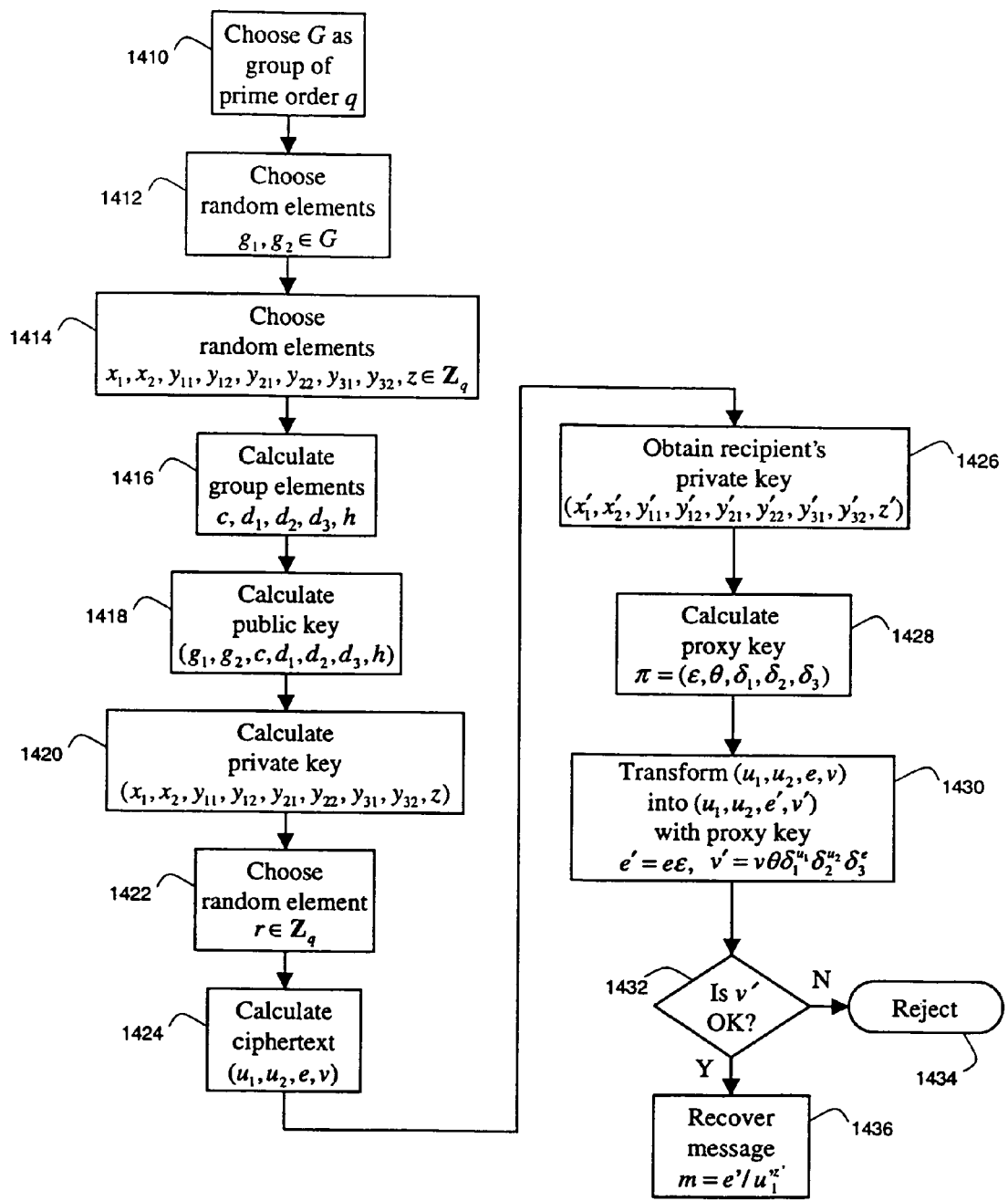
FIG. 14 is a flow chart illustrating the steps performed in an embodiment of a Cramer-Shoup-based proxy encryption and decryption scheme according to the invention.

Referring now to FIG. 14, the system is set up by choosing G as a group of prime order q, where q is large (step 1410). Then, as above, key is generated as follows. First, random elements $g_1,g_2 \in G$ are chosen (step 1412), and random elements $x_1,x_2,y_{11},y_{12},y_{21},y_{22},y_{31},y_{32},z \in Z_q$ are chosen (step 1414). Next, the group elements $c=g_1^{x_1}g_2^{x_2}$, $d_1=g_1^{y_{11}}g_2^{y_{12}}$, $d_2=g_1^{y_{21}}g_2^{y_{22}}$, $d_3=g_1^{y_-}g_2^{y_{32}}$, and $h=g_1^z$ are computed (step 1416). The public key is then calculated to be $(g_1, g_2, c, d_1, d_2, d_3, h)$ (step 1418) and the private key is calculated to be $(x_1,x_2,y_{11},y_{12},y_{21},y_{22},y_{31},y_{32},z)$ (step 1420).

Given a message $m \in G$, the encryption method begins by choosing $r \in Z_q$ at random (step 1422). Then the ciphertext $(u_1,u_2,e,v)$ is calculated as follows (step 1424):

$$u_1=g_1^r,\ u_2=g_2^r,\ e=h^r m,\ \text{and}\ v=c^r d_1^{u_1 r} d_2^{u_2 r} d_3^{er}.$$

If B's private key is available for generating the transfer key $\pi$, that key is obtained (step 1426) and then $\pi$ can be calculated (step 1428) as follows:

$$\pi=(\epsilon,\theta,\delta_1,\delta_2,\delta_3)$$

where $$\epsilon=e'/e=g_1^{(z'-z)r}=u_1^{z'-z}$$

$$\theta=c^r/c^r=g_1^{(x_1'-x_1)r}g_2^{(x_2'-x_2)r}=u_1^{x_1'-x_1}u_2^{x_2'-x_2}$$

$$\delta_1=d_1'^r/d_1^r=u_1^{y_{11}'-y_{11}}u_2^{y_{12}'-y_{12}}$$

$$\delta_2=d_2'^r/d_2^r=u_1^{y_{21}'-y_{21}}u_2^{y_{12}'-y_{12}}$$

$$\delta_1=d_3'^{er}/d_3^{er}=u_1^{y_{31}'\epsilon-y_{31}}u_2^{y_{32}'\epsilon-y_{32}}$$

The ciphertext transformation is then $$u_1'=u_1, u_2'=u_2, e'=e\epsilon,\ \text{and}\ v'=v\theta\delta_1^{u_1}\delta_2^{u_2}\delta_3^e.$$

This transforms the ciphertext $(u_1,u_2,e,v)$ into $(u_1,u_2,e',v')$ (step 1430).

The recipient/delegatee is then able to decrypt the transformed cyphertext $(u_1,u_2,e',v')$. As above, the decryption algorithm first tests if $v'=u_1^{rx_1'+u_1'y_{11}'+u_2'y_{21}'+e'y_{31}'} u_2^{rx_2'+u_1'y_{12}'+u_2'y_{22}'+e'y_{32}'}$ (step 1432). If not, the decryption effort is rejected (step 1434). Otherwise, the message m is calculated as $m=e'/u_1^{z'}$ (step 1436).

In the case where only the public key of the delegatee B can be used for delegating the right to decrypt the message from the delegator A to B, one needs to save and use the random number r used initially in encrypting the message for A. This may be a problem where the party to generate the transfer key is not A, and may not be a problem if the party is, in fact, A. In any case, if it is available, the transfer key $\pi$ can be generated using B's public key as follows:

$$\pi=(\epsilon,\theta,\delta_1,\delta_2,\delta_3)$$

where $$\epsilon=e'/e=(g_1^{z'}/g_1^z)^r=(h'/h)^r$$

$$\theta=c'^r/c^r=(c'/c)^r$$

$$\delta_1=d_1'^r/d_1^r=(d_1'/d_1)^r$$

$$\delta_2=d_2'^r/d_2^r=(d_2'/d_2)^r$$

$$\delta_1=d_3'^{er}/d_3^{er}=(d_3'^\epsilon/d_3)^r$$

The proxy transformation is then $$u_1'=u_1,\ u_2'=u_2,\ e'=e\epsilon,\ \text{and}\ v'=v\theta\delta_1^{u_1}\delta_2^{u_2}\delta_3^e.$$

It is straightforward to verify, in either case, that the delegatee B can use his own private key to decrypt the ciphertext $(u_1',u_2',e',v')$ transformed by the methods set forth above. Since the mechanisms used herein on the Cramer-Shoup cryptosystem are the same as those used above on ElGamal-like cryptosystems, they are public and non-commutative, assuming the Diffie-Hellman problem and the discrete logarithm problem are difficult to solve.

As described above, through enhancing common public-key encryption schemes with the proxy encryption capability, it becomes possible to support flexible designated decryption. This disclosure has presented two public and non-commutative proxy encryption schemes, which have inherited the merits of the existing schemes and discarded their shortcomings. The new schemes have been shown to have direct applications to massive document distribution and file protection. The basic idea of these new schemes has also been applied to cryptosystems of other types such as the Cramer-Shoup cryptosystem, enhancing them into proxy encryption schemes.

While the various aspects of the present invention have been described with reference to several aspects and their embodiments, those embodiments are offered by way of example, not by way of limitation. The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical applications to thereby enable others skilled in the art to best utilize the invention in various embodiments and with various modifications as are suited to the particular use contemplated.

Those skilled in the art will be enabled by this disclosure will be enabled by this disclosure to make various obvious additions or modifications to the embodiments described herein; those additions and modifications are deemed to lie within the scope of the present invention. It is intended that the scope of the invention be defined by the claims appended hereto.

What is claimed is:

1. A method for encrypting an original document for distribution to a selected recipient chosen from a plurality of possible recipients, comprising the steps of:
    generating a session key based on a random number privately maintained only by the owner, including an encryptor, of the original document;
    encrypting the original document with the session key to create an encrypted document;
    generating a proxy key based on a public key corresponding to the selected recipient, wherein the proxy key may be published without compromising its security, and wherein the proxy key, when applied to a document encrypted for a recipient, is used to transform the document into a document encrypted for another recipient without decrypting the message in the process; and
    applying the proxy key to the encrypted document to transform the encrypted document into a transformed document, wherein the transformation may occur in a trusted environment without compromising its security, wherein the transformation may occur in an untrusted environment without compromising its security, and wherein the encrypted document remains in an encrypted state while being transformed into the transformed document and is not decrypted to the original document and re-encrypted at any point during the transformation.

2. The method of claim 1, further comprising the step of transmitting the transformed document to the selected recipient.

3. The method of claim 1, further comprising the steps of:
    recovering the session key from the transformed document; and
    decrypting the transformed document with the session key to recover the original document.

4. The method of claim 3, wherein the recovering step is performed by applying a private key corresponding to the selected recipient.

5. The method of claim 1, wherein the encrypting step is performed with a combination of a symmetric private-key encryption scheme and an asymmetric public-key encryption scheme.

6. The method of claim 5, wherein the asymmetric public-key encryption scheme is based on the ElGamal cryptosystem.

7. The method of claim 5, wherein the encrypted document comprises a first portion representative of the original document encrypted via the symmetric private-key encryption scheme using the session key, and a second portion representative of the session key encrypted using an owner's private key according to the asymmetric public-key encryption scheme.

8. The method of claim 1, wherein the original document is distributed to the selected recipient through at least one additional intermediate grantor by repeating the following steps for each additional intermediate grantor:
    generating a new proxy key based on the intermediate grantor's public key; and
    transforming the encrypted document with the new proxy key to create a transformed document customized for the intermediate grantor.

9. The method of claim 1, wherein the encrypted document has been encrypted with a Cramer-Shoup encryption scheme.

10. The method of claim 5, wherein the encrypted document comprises a first portion representative of the original document encrypted via the symmetric private-key encryption scheme using the session key, and a second portion representative of the session key encrypted using an owner's private key according to the asymmetric public-key encryption scheme.

11. The method of claim 1, wherein the encrypted document has been encrypted with a modified ElGamal encryption scheme.

12. The method of claim 1, wherein the steps of generating a session key, encrypting the original document, generating a proxy key, and transforming the encrypted document are performed by the grantor.

13. A system operable to encrypt an original document for distribution to a selected recipient chosen from a plurality of possible recipients, comprising:
    a session key generation system that generates a session key based on a random number privately maintained only by the owner, including an encryptor, of the original document;
    an encryption system that encrypts the original document with the session key to create an encrypted document;
    a proxy key generation system that generates a proxy key based on a public key corresponding to the selected recipient, wherein the proxy key may be published without compromising its security, and wherein the proxy key, when applied to a document encrypted for a recipient, is used to transform the document into a document encrypted for another recipient without decrypting the message in the process; and
    a transformation system that applies the proxy key to the encrypted document to transform the encrypted document into a transformed document, wherein the transformation may occur in a trusted environment without compromising its security, wherein the transformation may occur in an untrusted environment without compromising its security, and wherein the encrypted document remains in an encrypted state while being transformed into the transformed document and is not decrypted to the original document and re-encrypted at any point during the transformation.

14. The system of claim 13, further comprising a transmitting system that transmits the transformed document to the selected recipient.

15. The system of claim 13, further comprising:
    a recovering system that recovers the session key from the transformed document; and
    a decrypting system that decrypts the transformed document with the session key to recover the original document.

16. The system of claim 13, wherein the recovery of the session key is performed by applying a private key corresponding to the selected recipient.

17. The system of claim 13, wherein the encryption is performed with a combination of a symmetric private-key encryption scheme and an asymmetric public-key encryption scheme.

18. The system of claim 17, wherein the asymmetric public-key encryption scheme is based on the ElGamal cryptosystem.

19. The system of claim 17, wherein the encrypted document comprises a first portion representative of the original document encrypted via the symmetric private-key encryption scheme using the session key, and a second portion representative of the session key encrypted using an owner's private key according to the asymmetric public-key encryption scheme.

20. The system of claim 13, wherein the original document is distributed to the selected recipient through at least one additional intermediate grantor by using the proxy key generation system to generate a new proxy key based on the intermediate grantor's public key, and using the transformation system to transform the encrypted document with the new proxy key to create a transformed document customized for the intermediate grantor.

21. The system of claim 13, wherein the encrypted document has been encrypted with a Cramer-Shoup encryption scheme.

22. The system of claim 13, wherein the encrypted document has been encrypted with a modified ElGamal encryption scheme.

* * * * *